US012663308B2

(12) United States Patent
Chen et al.

(10) Patent No.: US 12,663,308 B2
(45) Date of Patent: Jun. 23, 2026

(54) METHOD AND APPARATUS OF DISTRIBUTED ACOUSTIC SENSING

(71) Applicant: EXFO Inc., Quebec (CA)

(72) Inventors: Hongxin Chen, Montreal (CA); Michel Leblanc, Quebec (CA)

(73) Assignee: EXFO Inc., Quebec (CA)

( * ) Notice: Subject to any disclaimer, the term of this patent is extended or adjusted under 35 U.S.C. 154(b) by 292 days.

(21) Appl. No.: 18/624,663

(22) Filed: Apr. 2, 2024

(65) Prior Publication Data

US 2024/0344878 A1      Oct. 17, 2024

Related U.S. Application Data

(60) Provisional application No. 63/495,385, filed on Apr. 11, 2023.

(51) Int. Cl.
*G01H 9/00* (2006.01)
*G01D 5/353* (2006.01)

(52) U.S. Cl.
CPC ......... *G01H 9/004* (2013.01); *G01D 5/35358* (2013.01)

(58) Field of Classification Search
CPC ........................... G01H 9/004; G01D 5/35358
See application file for complete search history.

(56) References Cited

U.S. PATENT DOCUMENTS

| | | | |
|---|---|---|---|
| 5,194,847 A | 3/1993 | Taylor et al. | |
| 6,778,720 B1 | 8/2004 | Cekorich et al. | |

| | | | |
|---|---|---|---|
| 7,920,253 B2 | 4/2011 | Cyr et al. | |
| 7,957,436 B2 | 6/2011 | Chen et al. | |
| 8,923,663 B2 | 12/2014 | Hill et al. | |
| 9,170,149 B2 | 10/2015 | Hartog et al. | |
| 9,228,890 B2 * | 1/2016 | Omichi .................. G01H 9/004 |

(Continued)

FOREIGN PATENT DOCUMENTS

| | | | |
|---|---|---|---|
| CA | 2946279 C | 11/2018 | |
| CN | 115452191 A * | 12/2022 | ............. G01K 11/32 |

(Continued)

OTHER PUBLICATIONS

D. Villafani Caballero, J. P. von der Weid, Patryk Urban. Tuneable OTDR measurements for WDM-PON monitoring, Conference: Microwave & Optoelectronics Conference (IMOC), 2013 SBMO/IEEE MTT-S International Conference Paper • Aug. 2013 [online], [retrieved on Mar. 20, 2015]. Retrieved from the Internet <URL: https://www.researchgate.net/profile/Diego-Rodrigo-Villafani-Caballero/publication/261245400_Tuneable_OTDR_measurements_for_WDM-PON_monitoring/>.

(Continued)

*Primary Examiner* — John Fitzgerald
(74) *Attorney, Agent, or Firm* — Helene Chotard

(57) ABSTRACT

There is provided a method and system of frequency dithered distributed acoustic sensing (FD-DAS) using group data signal processing, where the continuous wave (CW) coherent laser's optical frequency or optical phase for the FD-DAS interrogator may be set in evenly or randomly distributed manner for different data groups but they are kept as constant or with negligibly variation within each data group. Such FD-DAS may be used to improve acoustic or vibration signal measurement reliability, to allow to use a low-cost single-frequency laser such as a DFB laser, and/or to suppress polarization fading effect.

19 Claims, 10 Drawing Sheets

(56) References Cited

U.S. PATENT DOCUMENTS

| | | | | |
|---|---|---|---|---|
| 9,476,760 | B2 * | 10/2016 | Brady | G01H 9/004 |
| 9,641,243 | B2 | 5/2017 | Perron | |
| 10,048,115 | B2 * | 8/2018 | Farhadiroushan | |
| | | | | G01D 5/35306 |
| 10,345,138 | B2 | 7/2019 | Milione et al. | |
| 10,393,572 | B2 * | 8/2019 | Farhadiroushan | G01F 1/66 |
| 10,429,234 | B2 | 10/2019 | Nishiguchi et al. | |
| 10,697,824 | B2 | 6/2020 | Cedilnik | |
| 11,169,019 | B2 | 11/2021 | Chen et al. | |
| 11,237,025 | B2 | 2/2022 | Issa et al. | |
| 11,698,288 | B2 * | 7/2023 | Hveding | G01H 9/004 |
| | | | | 385/13 |
| 11,815,373 | B2 | 11/2023 | Issa et al. | |
| 11,976,552 | B2 * | 5/2024 | Skinner | E21B 47/135 |
| 12,326,533 | B2 * | 6/2025 | Li | G01V 1/18 |
| 2012/0177174 | A1 | 7/2012 | Ikhlef et al. | |
| 2012/0280117 | A1 | 11/2012 | Lewis et al. | |
| 2013/0319121 | A1 | 12/2013 | Hill et al. | |
| 2016/0169712 | A1 * | 6/2016 | Farhadiroushan | G01F 1/661 |
| 2017/0082484 | A1 | 3/2017 | Farhadiroushan et al. | |
| 2017/0149496 | A1 | 5/2017 | Perron et al. | |
| 2020/0393290 | A1 | 12/2020 | Chen et al. | |
| 2021/0140814 | A1 | 5/2021 | Aktas et al. | |
| 2021/0356776 | A1 | 11/2021 | Ip et al. | |
| 2021/0359755 | A1 | 11/2021 | Rochat | |
| 2022/0128383 | A1 | 4/2022 | Huang et al. | |
| 2023/0314605 | A1 | 10/2023 | Costa et al. | |
| 2024/0012167 | A1 | 1/2024 | Chen et al. | |
| 2024/0134076 | A1 | 4/2024 | Chen et al. | |

FOREIGN PATENT DOCUMENTS

| | | | |
|---|---|---|---|
| EP | 3933371 | A1 | 1/2022 |
| GB | 2442745 | A | 4/2008 |
| WO | 2007036051 | A1 | 4/2007 |
| WO | 2014201057 | A2 | 12/2014 |
| WO | 2017127212 | A1 | 7/2017 |
| WO | 2017139579 | A1 | 8/2017 |
| WO | 2020032878 | A1 | 2/2020 |

OTHER PUBLICATIONS

K De Souza. Significance of coherent Rayleigh noise in fibre-optic distributed temperature sensing based on spontaneous Brillouin scattering. Measurement Science and Technology, vol. 17, No. 5, pp. 1065-1069 Published Apr. 7, 2006 • 2006 IOP Publishing Ltd [online], [retrieved on Sep. 21, 2022]. Retrieved from the Internet <URL: https://iopscience.iop.org/article/10.1088/0957-0233/17/5/S21> <DOI 10.1088/0957-0233/17/5/S21>.

Hisashi Izumita, Shin-ichi Furukawa, Yahei Koyomada, and Izumi Sankawa. Fading Noise Reduction in Coherent OTDR. IEEE Photonics Technology Letters, vol. 4, No. 2, Feb. 1992 p. 201-203. [online], [retrieved on Jun. 3, 2022]. Retrieved from the Internet <URL: https://ieeexplore.ieee.org/document/122361>. <DOI: 10.1109/68.122361>.

Zhaoyong Wang, Bin Lu, Qing Ye, Haiwen Cai. Recent Progress in Distributed Fiber Acoustic Sensing with Φ-OTDR. Published: Nov. 18, 2020 MDPI Journals-Sensors-vol. 20 Issue 22. [online], [retrieved on Jul. 28, 2022]. Retrieved from the Internet <URL: https://doi.org/10.3390/s20226594>.

María R. Fernandez-Ruiz, Juan Pastor-Graells, Hugo F. Martins, Andres Garcia-Ruiz, Sonia Martin-Lopez, and Miguel Gonzalez-Herraez. Laser Phase-Noise Cancellation in Chirped-Pulse Distributed Acoustic Sensors. Article in Journal of Lightwave Technology, 36(4), Oct. 2017 [online], [retrieved on Jun. 24, 2022]. Retrieved from the Internet <URL: https://www.researchgate.net/profile/Andres-Garcia-Ruiz/publication/320638820_Laser_Phase-Noise_Cancellation_in_Chirped-Pulse_Distributed_Acoustic_Sensors/>.

Yonas Muanenda, Claudio J. Oton, Stefano Faralli, Fabrizio Di Pasquale. A Cost-Effective Distributed Acoustic Sensor Using a Commercial Off-the-Shelf DFB Laser and Direct Detection Phase-OTDR. IEEE Photonics Journal, vol. 8, No. 1, Feb. 2016. [online], [retrieved on Jun. 24, 2022]. Retrieved from the Internet <URL: https://ieeexplore.ieee.org/stamp/stamp.jsp?tp=&arnumber=7355285> <DOI: 10.1109/JPHOT.2015.2508427>.

H. Chen, R. Baribault, M. Leclerc, É. Morin-Drouin, S. Perron, B. Ruchet, É. Thomassin, G. W. Schinn. Widely Tunable SOA-Based OTDR Employing a Cost-Effective Source Configuration. Optical Fiber Communication (OFC) Conference, Mar. 4-8, 2012, Los Angeles, CA, USA. [retrieved on Sep. 23, 2022]. Retrieved from the Internet <URL: https://ieeexplore.ieee.org/document/6476223>.

Unknown Author, Laser Lab Source. Semiconductor Optical Amplifier (SOA) Ultra-Fast PULSE and CW Control Electronics and Mounting Module. Datasheet [online]. Laser Diode Control [retrieved on Sep. 14, 2022]. Retrieved from the Internet: <URL: https://www.laserdiodecontrol.com/files/pdfs/laserdiodecontrol_com/8303/DATA_SHEET___Semiconductor_Optical_Amplifier__SOA__Ultra_Fast_PULSE_and_CW_Mode_Control_Electronics_and_Mounting_Module___Model_SOA_STD___Control_and_Mount_Module-1659477884.pdf>.

Sascha Liehr et al., Wavelength-scanning coherent OTDR for dynamic high strain resolution sensing, Optics Express, vol. 26 Issue 8, pp. 10573-10588 (2018), Retrieved from the Internet:< URL: https://opg.optica.org/directpdfaccess/7fb23c10-c287-4a22-b56c1068f708c829_385526/oe-26-8-10573.pdf?da=1&id=385526&seq=0&mobile=no> <DOI:10.1364/OE.26.010573>. >.

Mengmeng Chen, Ali Masoudi, and Gilberto Brambilla, "Performance analysis of distributed optical fiber acoustic sensors based on φ-OTDR," Optics Express vol. 27, Issue 7, pp. 9684-9695 (2019), <https://doi.org/10.1364/OE.27.009684>.

Zhaoyong Wang, Bin Lu, Qing Ye, Haiwen Cai. Recent Progress in Distributed Fiber Acoustic Sensing with Φ-OTDR. Published: Nov. 18, 2020 MDPI Journals-Sensors-vol. 20 Issue 22. [online], [retrieved on Jun. 24, 2022]. Retrieved from the Internet <URL: https://doi.org/10.3390/s20226594>.

Hino Tomoyuki, Aono Yoshiaki, Ming-Fang Huang, Tanaka Toshiaki, Sakurai Hitoshi. Optical Fiber Sensing Technology Visualizing the Real World via Network Infrastructures. Jan. 2020 NEC Technical Journal vol. 14 No. 1 Special Issue on AI and Social Value Creation [online], [retrieved on Jul. 5, 2022]. Retrieved from the Internet <URL: https://www.nec.com/en/global/techrep/journal/g19/n01/190119.html>.

Tiejun J. Xia, Glenn A. Wellbrock, Ming-Fang Huang, Shaobo Han, Yuheng Chen, Milad Salemi, Philip N. Ji, Ting Wang and Yoshiaki Aono. Field Trial of Abnormal Activity Detection and Threat Level Assessment with Fiber Optic Sensing for Telecom Infrastructure Protection. Optical Fiber Communication Conference 2021 © OSA 2021 Washington, DC United States Jun. 6-11, 2021 ISBN: 978-1-943580-86-6. [online], [retrieved on May 28, 2022]. Retrieved from the Internet <URL: https://opg.optica.org/abstract.cfm?uri=OFC-2021-Th4H.3>.

María R. Fernandez-Ruiz, Luis Costa and Hugo F. Martins. Distributed Acoustic Sensing Using Chirped-Pulse Phase-Sensitive OTDR Technology. Published: Oct. 9, 2019 Sensors 2019, vol. 19, issue 20, 4368 [online], [retrieved on Jun. 24, 2022]. Retrieved from the Internet <URL: https://doi.org/10.3390/s19204368>.

María R. Fernandez-Ruiz, Juan Pastor-Graells, Hugo F. Martins, Andres Garcia-Ruiz, Sonia Martin-Lopez, and Miguel Gonzalez-Herraez. Laser Phase-Noise Cancellation in Chirped-Pulse Distributed Acoustic Sensors. Article in Journal of Lightwave Technology, Oct. 2017 [online], [retrieved on Jun. 24, 2022]. Retrieved from the Internet <URL: https://www.researchgate.net/profile/Andres-Garcia-Ruiz/publication/320638820_Laser_Phase-Noise_Cancellation_in_Chirped-Pulse_Distributed_Acoustic_Sensors/links/5a673dc6aca2720266b44276/Laser->.

Yonas Muanenda. Recent Advances in Distributed Acoustic Sensing Based on Phase-Sensitive Optical Time Domain Reflectometry. Hindawi Journal of Sensors vol. 2018, Article ID 3897873, 16 pages Published May 13, 2018 [online], [retrieved on Jun. 24, 2022]. Retrieved from the Internet <URL: https://downloads.hindawi.com/journals/js/2018/3897873.pdf?_ga=2.50076832.781370192.1687980500-60385717.1687980500> <URL: https://doi.org/10.1155/2018/3897873>.

(56) References Cited

OTHER PUBLICATIONS

Yonas Muanenda, Claudio J. Oton, Stefano Faralli, Fabrizio Di Pasquale. A Cost-Effective Distributed Acoustic Sensor Using a Commercial Off-the-Shelf DFB Laser and Direct Detection Phase-OTDR. IEEE Photonics Journal, vol. 8, No. 1, Feb. 2016. [online], [retrieved on Jun. 24, 2022]. Retrieved from the Internet <URL: https://ieeexplore.ieee.org/stamp/stamp.jsp?tp=&arnumber= 7355285> <URL: https://ieeexplore.ieee.org/document/7355285>. <DOI: 10.1109/JPHOT.2015.2508427>.

Hisashi Izumita, Shin-ichi Furukawa, Yahei Koyamada, and Izumi Sankawa. Fading Noise Reduction in Coherent OTDR. IEEE Photonics Technology Letters, vol. 4, No. 2, Feb. 1992 p. 201-203. [online], [retrieved on Jun. 3, 2022]. Retrieved from the Internet <URL: https://ieeexplore.ieee.org/document/122361>. <DOI: 10.1109/ 68.122361>.

Juan C. Juarez, Eric W. Maier, Kyoo Nam Choi, Henry F. Taylor. Distributed Fiber-Optic Intrusion Sensor System. Journal of Lightwave Technology, vol. 23, No. 6, Jun. 2005, pp. 2081-2087.

[online], [retrieved on Jul. 28, 2022]. Retrieved from the Internet <URL: https://ieeexplore.ieee.org/document/1440515>. <DOI: 10.1109/ JLT.2005.849924>.

R. Juskaitis, A. M. Mamedov, V. T. Potapov, S. V. Shatalin. Interferometry with Rayleigh backscattering in a single-mode optical fiber. Optical Society of America, Optics Letters, vol. 19, No. 3, pp. 225-227, Feb. 1, 1994. [online], [retrieved on Jul. 28, 2022]. Retrieved from the Internet <URL: https://opg.optica.org/ol/viewmedia. cfm?uri=ol-19-3-225&seq=0>. <https://doi.org/10.1364/OL.19. 000225>.

Austin Park, Intelligent Perimeter & Intrusion Detection Fiber Optic Sensing. NEC Corporation of America Advanced Recognition System, Nov. 6, 2019. [online], [retrieved on Jul. 5, 2022]. Retrieved from the Internet <URL: https://alert.northeastern.edu/assets/adsa/ adsa21_presentations/26_Park.pdf>.

Arthur H. Hartog. an Introduction to Distributed Optical Fibre Sensors. CRC Press Taylor and Francis Group, Series in fiber optic sensors, 2017, p. 235-240, 275-276.

* cited by examiner

FREQUENCY DITHERED DISTRIBUTED ACOUSTIC SENSING

*FREQUENCY DITHERED DISTRIBUTED ACOUSTIC SENSING*

METHOD AND APPARATUS OF DISTRIBUTED ACOUSTIC SENSING

TECHNICAL FIELD

The present description generally relates to method and apparatus of fiber optic distributed acoustic sensing (DAS) employed, e.g., for the applications of fiber cable monitoring, fiber cable route data collection, and fiber cable trouble-shooting for fiber optic telecommunication networks and/or monitoring third-party interference of the fiber optic perimeter intrusions.

BACKGROUND

Distributed Acoustic Sensing (DAS) is a technology that enables continuous, real-time measurements along the entire length of a fiber optic cable to provide distributed strain and vibration sensing. DAS technology is used in the art to detect intrusion in security perimeter monitoring, to monitor highway traffic, monitor pipelines, etc.

Rayleigh scatter-based DAS uses a Coherent OTDR (C-OTDR) where a coherent laser pulse is sent along the optical fiber. As similar measurement technique in conventional OTDRs, for the C-OTDR the interfered intensities of any two or more reflected coherent lights are measured as a function of time after transmission of the laser pulse. Changes in the reflected interfered intensity of successive pulses reflected from a same section of fiber are indicative of a disturbance along that section.

DAS technology can be split into two main variations (see Hartog, "An introduction to distributed optical fibre sensors", CRC Press, pp. 235-240), i.e., differential phase-based DAS and amplitude-based DAS. The differential phase DAS is more reliable but is also more complex, very expensive, bulky in size and not very reliable for the field application because of the too complicated instrument design.

The amplitude-based DAS variation is simpler but suffers from a lack of linearity due to its unpredictable variation of the transfer function along the fiber. Amplitude-based DAS does not directly probe acoustic or vibration signals. It rather measures or monitor intra-pulse interferences that are caused by acoustic or vibration signals. Such measurement suffers from a lack of linearity due to (1) initial phase value that is dependent on both laser phase and event location and (2) a polarization fading effect. These two problems cause unstable measurements for the intra-pulse interferences and usually such unstable measurement produce measurement instability and uncertainty on both event location (position) along the fiber and intra-pulse interfered signal intensity. However, it has still shown to be very useful in order to detect disturbances along the optical fiber (see Hartog).

There therefore remains a need for a simple and low-cost DAS system that can still provide reliable and accurate monitoring results for optical fiber monitoring, fiber cable troubleshooting and fiber identification applications in optical fiber telecommunication networks.

SUMMARY

There is provided a method and system of frequency dithered distributed acoustic sensing (FD-DAS) using group data signal processing, where the continuous wave (CW) coherent laser's optical frequency or laser wavelength or optical phase for the FD-DAS interrogator may be set in evenly or randomly distributed manner for different data groups but they are kept as constant or with negligibly variation within each data group. Such FD-DAS may be used to improve acoustic or vibration signal measurement reliability, to allow the use of a low-cost single-frequency laser such as a narrow linewidth DFB laser with some small laser phase or frequency noise. Moreover, this technique may also be used to suppress polarization fading effect.

The proposed solution aims at providing a simple and low-cost DAS system and method, while still providing reliable monitoring results for optical fiber monitoring, fiber cable troubleshooting and fiber identification applications in optical fiber telecommunication networks. The reliability of the amplitude-based coherent Rayleigh scattering DAS is improved using frequency dithered DAS acquisitions.

In accordance with one aspect, there is proposed to add frequency dithering to the coherent laser used for DAS acquisitions, i.e., slightly tune the center frequency (or the laser wavelength or optical phase) of the coherent laser of the DAS integrator between groups of data acquisitions.

In accordance with another aspect, there is provided a fiber optic distributed acoustic sensing (DAS) method for performing acoustic and vibration measurements. The method comprises:

performing repetitive DAS acquisitions toward an end of an optical fiber link using a DAS acquisition device comprising a coherent Optical Time Domain Reflectometer (OTDR) to provide DAS traces, wherein each DAS acquisition is performed by propagating in the optical fiber link, a pulsed test signal and detecting corresponding return light from the optical fiber link so as to obtain a DAS trace representing backscattered and reflected light as a function of distance in the optical fiber link;

processing DAS traces in groups to produce a DAS signal associated with each said group; and changing at least one of an optical frequency and an optical phase of said pulsed test signal while performing said repetitive DAS acquisitions such that said at least one of an optical frequency and an optical phase varies in-between groups of DAS traces while remaining substantially constant within each said group.

In accordance with yet another aspect, there is provided a fiber optic distributed acoustic sensing (DAS) system for performing acoustic and vibration measurements. The DAS system comprises:

a DAS acquisition device connectable toward an end of the optical fiber link and comprising a coherent Optical Time Domain Reflectometer (OTDR) for performing repetitive DAS acquisitions, wherein each DAS acquisition is performed by propagating in the optical fiber link, a pulsed test signal and detecting corresponding return light from the optical fiber link so as to obtain a DAS trace representing backscattered and reflected light as a function of distance in the optical fiber link, wherein said coherent OTDR is tunable;

a memory to store said DAS traces, at least one group of DAS traces at a time; and a processing unit receiving and processing DAS traces in groups to produce a DAS signal associated with each said group; and the DAS acquisition device comprising a control box used to tune said coherent OTDR while performing said repetitive DAS acquisitions such that at least one of an optical frequency and an optical phase of said pulsed test signal varies in-between groups of DAS traces while remaining substantially constant within each said group.

In some embodiments, a different center optical frequency of the coherent laser of the DAS integrator is set for each group of data acquisitions. Each group data acquisition (e.g., 10 or 100 group data, each group data containing, e.g., 64 DAS traces) is performed with one fixed laser frequency (or negligible frequency drifting) but the optical frequency is changed in-between groups (i.e., with a small laser tuning step AA between consecutive data groups).

In some other embodiments, different center frequencies may be obtained by slowly and continuously modulating or scanning the laser optical frequency during the measurement of many groups of data acquisitions (e.g., the laser drive current may be slowly and continuously modulated, for example, under any defined modulation waveform). This way, each group data is acquired with a negligible optical frequency shift within the group (e.g., about 0.1 to 0.2 radian), but the optical frequency or phase changes slightly in-between groups.

Both techniques may significantly improve the acoustic or vibration signal measurement reliability by suppressing the DAS measurement error induced by the initial laser phase or frequency, to thereby allow to use low-cost single-frequency laser such as a distributed-feedback laser (DFB) laser, since most low-cost DFB lasers as commercially available have some laser phase and/or frequency noise.

Furthermore, in order to also act on the polarization fading effect, the above stepped tuning method may be applied with a larger tuning steps AA (e.g., about 0.4 nm or one ITU channel optical frequency spacing) between groups of data acquisition or any number of tuning steps AA. Such larger tuning steps improve DAS measurement accuracy on both event location (position) and intra-pulse interfered intensity by suppressing both the initial phase induced DAS measurement error and the polarization fading effect on the DAS measurement.

For the proposed amplitude-based DAS instrument design, using dithering/modulating or tuning laser frequency may provide a more robust instrument design and significantly improves measurement reliability and accuracy on the vibration/acoustic event location and intensity measurements performed using low-cost optical components and existing commercially available OTDR electronics.

Data may also be processed over independent groups of data (or time buckets) to provide an independent DAS signal for each group. This allows measurements to be less sensitive to laser fluctuations and thereby reduces coherent laser technical specification requirements and allows the use of a low-cost coherent laser (thereby reducing the cost of the laser).

In some embodiments, quasi-continuous data sampling may also be employed. Data may be acquired in continuous but only over short periods of time (corresponding to groups), with a time lapse $\Delta T$ in-between to prevent memory saturation and allow time for processing the acquired data before the next acquisition. This technique reduces requirements for digitizer's data sampling, data transferring and saving, and digital signal processing (thereby reducing the cost of the sampling and acquisition electronics).

In this specification, unless otherwise mentioned, word modifiers such as "substantially" and "about" which modify a value, condition, relationship or characteristic of a feature or features of an embodiment, should be understood to mean that the value, condition, relationship or characteristic is defined to within tolerances that are acceptable for proper operation of this embodiment in the context its intended application.

Throughout this specification, reference is made to optical frequency, as in the center optical frequency of a laser source. It will be understood that an optical frequency may equivalently be expressed in wavelength, which represent different but equivalent units that can be used interchangeably for expressing the same physical characteristic of light. Furthermore, a tuning step or dithering of a laser source may be equivalently expressed in optical frequency units ($\Delta f$), wavelength units ($\Delta \lambda$) or optical phase ($\Delta \theta$).

In the present description, and unless stated otherwise, the terms "connected", "coupled" and variants and derivatives thereof refer to any connection or coupling, either direct or indirect, between two or more elements. The connection or coupling between the elements may be mechanical, physical, operational, electrical or a combination thereof.

Further features and advantages of the present invention will become apparent to those of ordinary skill in the art upon reading of the following description, taken in conjunction with the appended drawings.

The following description is provided to gain a comprehensive understanding of the methods, apparatus and/or systems described herein. Various changes, modifications, and equivalents of the methods, apparatuses and/or systems described herein will suggest themselves to those of ordinary skill in the art. Description of well-known functions and structures may be omitted to enhance clarity and conciseness.

Although some features may be described with respect to individual exemplary embodiments, aspects need not be limited thereto such that features from one or more exemplary embodiments may be combinable with other features from one or more exemplary embodiments.

BRIEF DESCRIPTION OF THE DRAWINGS

FIG. 2 comprises FIG. 2A and FIG. 2B wherein FIG. 2A is graph showing an example of FD-DAS signal processed trace for one data group showing two vibration signals from two fiber phase modulators and wherein

FIG. 3 comprises FIG. 3A and FIG. 3B wherein FIG. 3A is graph illustrating a quasi-continuous data sampling and group data acquisition for data group signal processing for many group OTDR data at different time, e.g., N data groups versus time, for fixed wavelength or optical frequency of the coherent laser, and wherein

FIG. 4 comprises FIG. 4A and FIG. 4B wherein

4B illustrates one group data acquisition for the group n, i.e., $n^{th}$ data group for signal processing for one group DAS data, e.g., containing K OTDR traces.

Figure 1A:
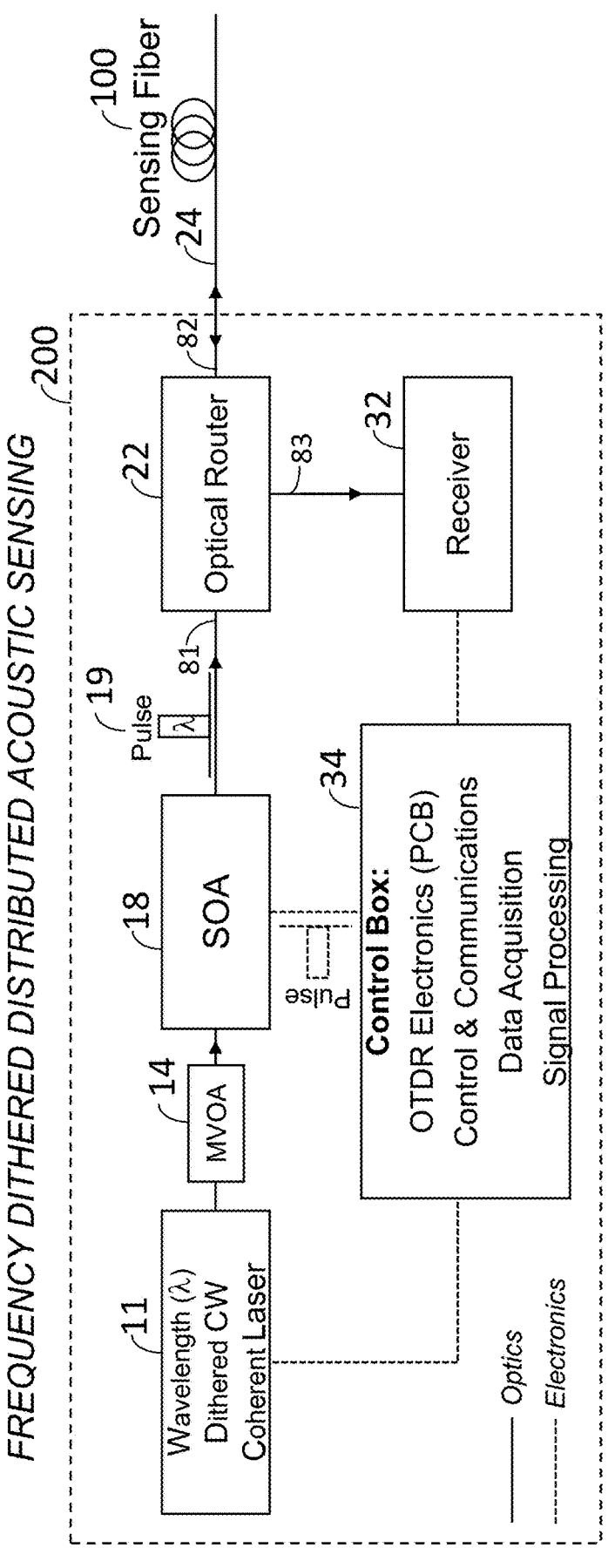
FIG. 1A is a block diagram illustrating a FD-DAS acquisition apparatus which comprises a wavelength tunable or frequency dithering CW coherent laser, in accordance with one embodiment.
Figure 1B:
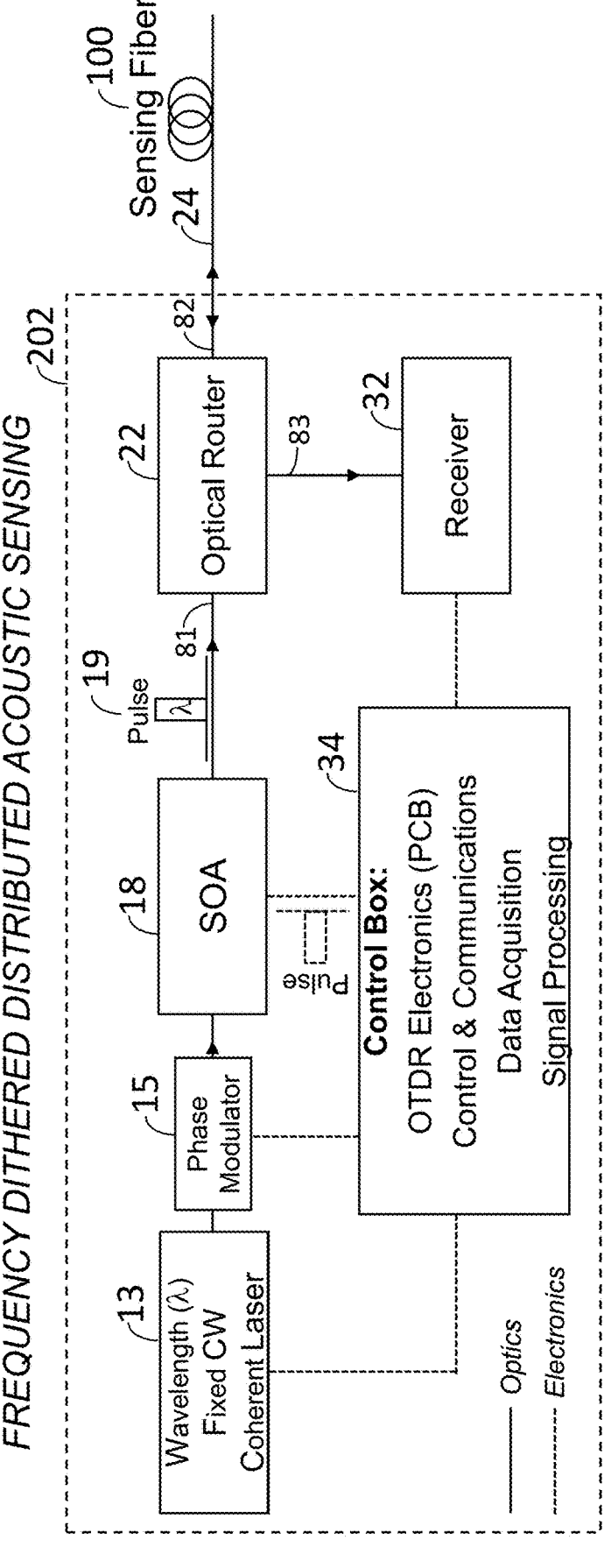
FIG. 1B is a block diagram illustrating another FD-DAS acquisition apparatus which comprises an external optical phase modulator or controller that may be used to modulate an optical phase of the coherent laser of the FD-DAS, in accordance with one embodiment.
Figures 4A, 4B:
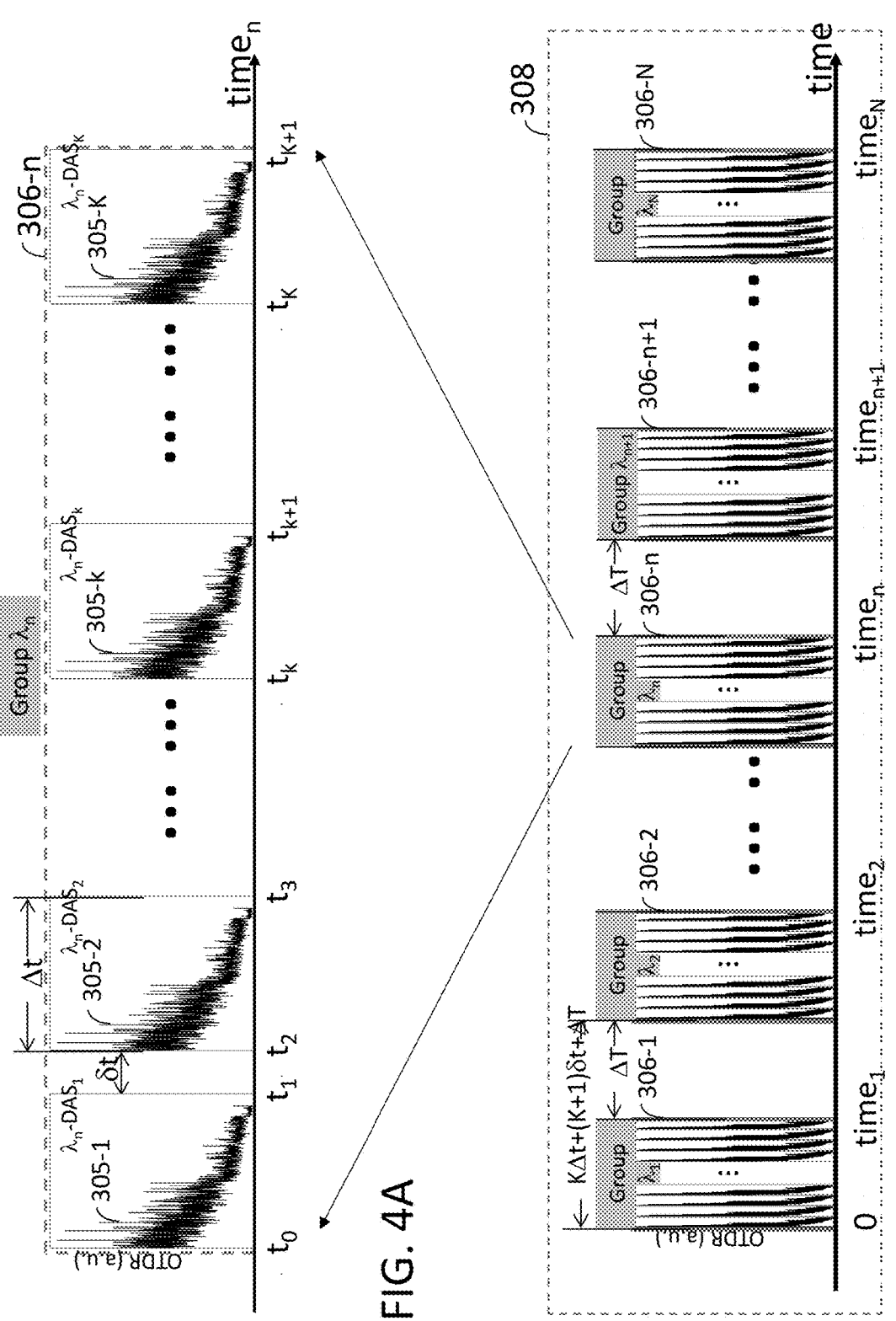
FIG. 4A illustrates quasi-continuous data sampling and group data acquisition for quasi-continuous data group signal processing for many group OTDR data at different times and different coherent laser wavelengths, e.g., N data groups versus time, in accordance with one embodiment; and FIG.
Figure 5:
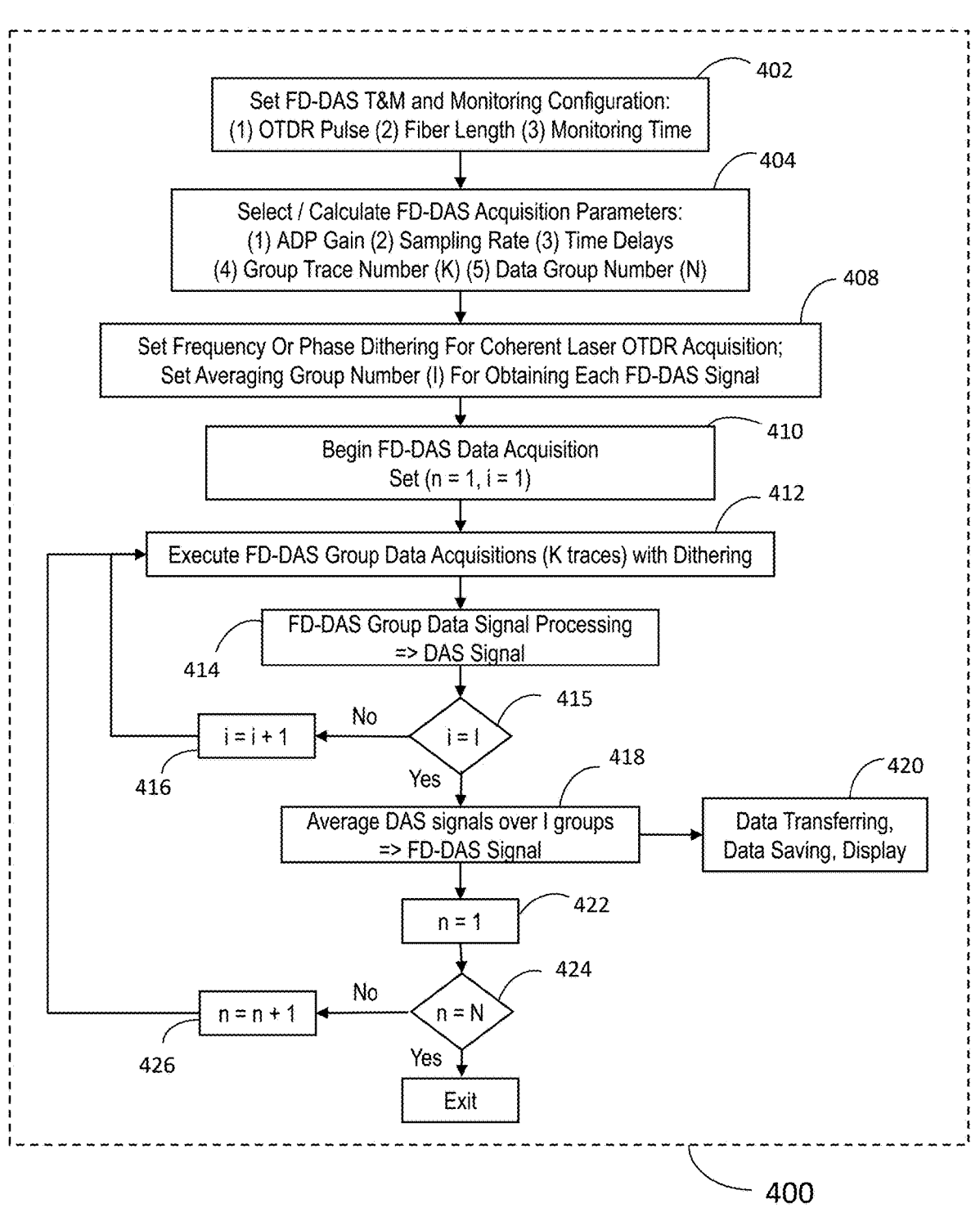

FIG. 5 is a flow chart illustrating a method according to implementations in FIGS. 1A, 1B, and 4B.

Figures 6A, 6B:
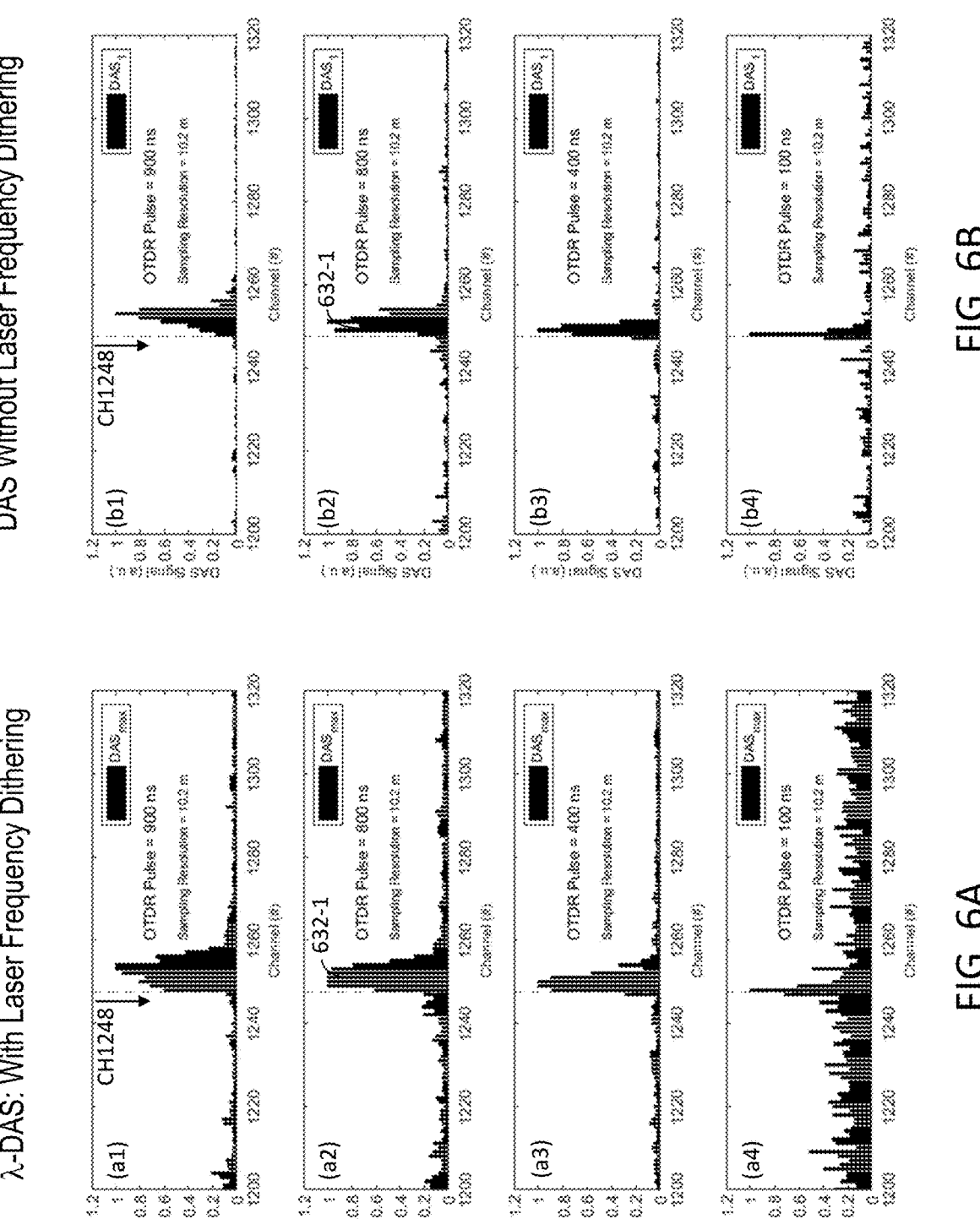

FIG. 6A comprises graphs (a1-a4) representing maximum envelope computation for laser frequency dithered FD-DAS reflectometric histograms from many data groups for different OTDR pulse widths of 100 ns, 400 ns, 800 ns and 900 ns for one fiber stretcher connected at location along 12.75 km of sensing optic fiber cable, in accordance with one example.

FIG. 6B comprises graphs (b1-b4) representing examples of FD-DAS histograms from one data group (i.e., without frequency dithering) using different OTDR pulse widths of 100 ns, 400 ns, 800 ns and 900 ns for one fiber stretcher connected at location along 12.75 km of sensing optic fiber cable.

Figures 7A, 7B, 7C:
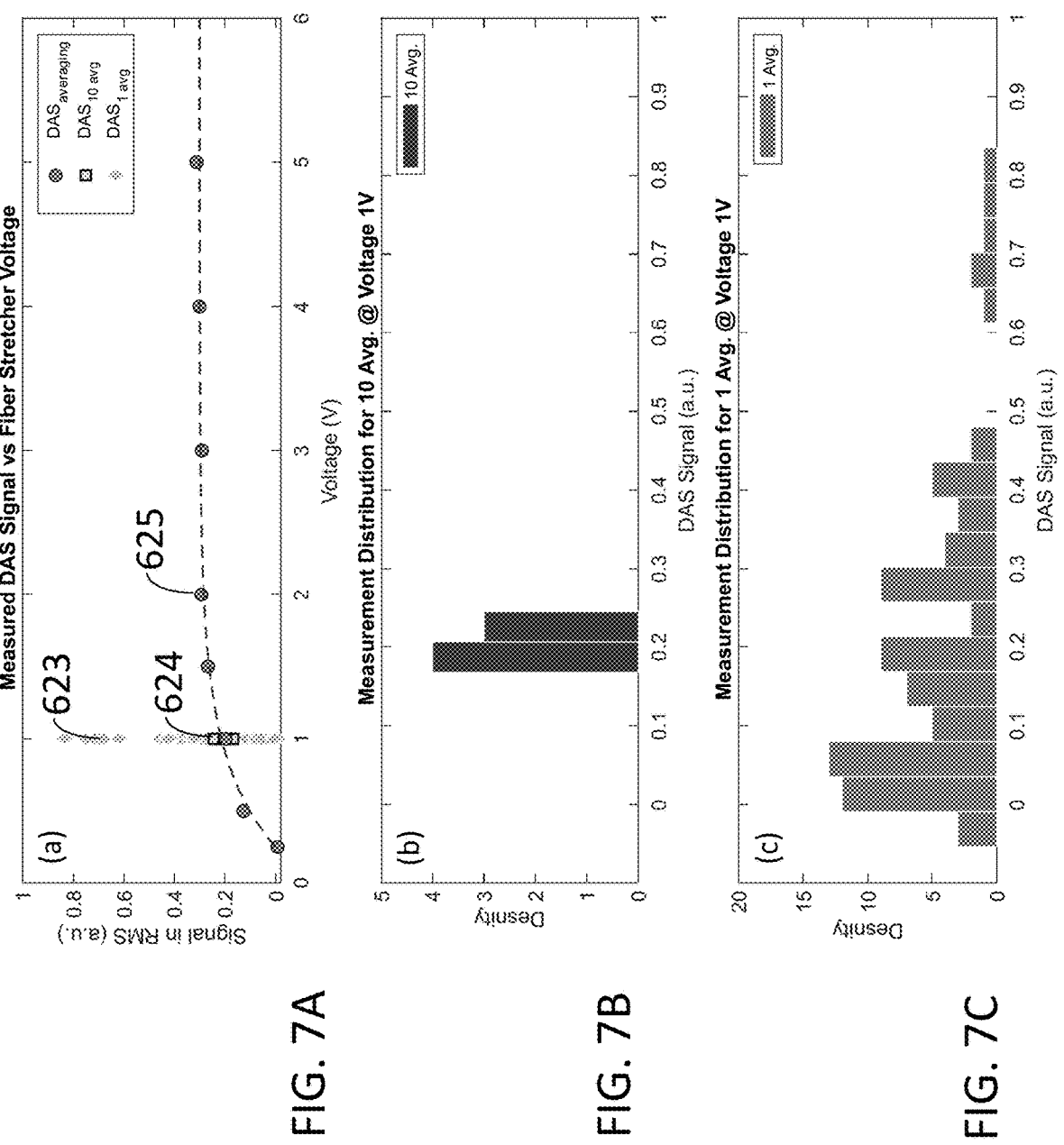

FIG. 7 comprises FIGS. 7A, 7B and 7C, wherein FIG. 7A is a graph showing examples of test results for averaged FD-DAS RMS signals over 40 to 80 data groups with different vibration strengths from a fiber stretcher that is connected at fiber location along 12.75 km, where 40 to 80 different data groups were acquired at different times with different coherent laser wavelengths for an OTDR pulse width of 100 ns, FIG. 7B is a graph showing a distribution of mean FD-DAS RMS signals after 10 averaging for 10 different coherent laser wavelengths, and FIG. 7C is graph showing a distribution of FD-DAS RMS signals without any averaging.

Figure 8A:
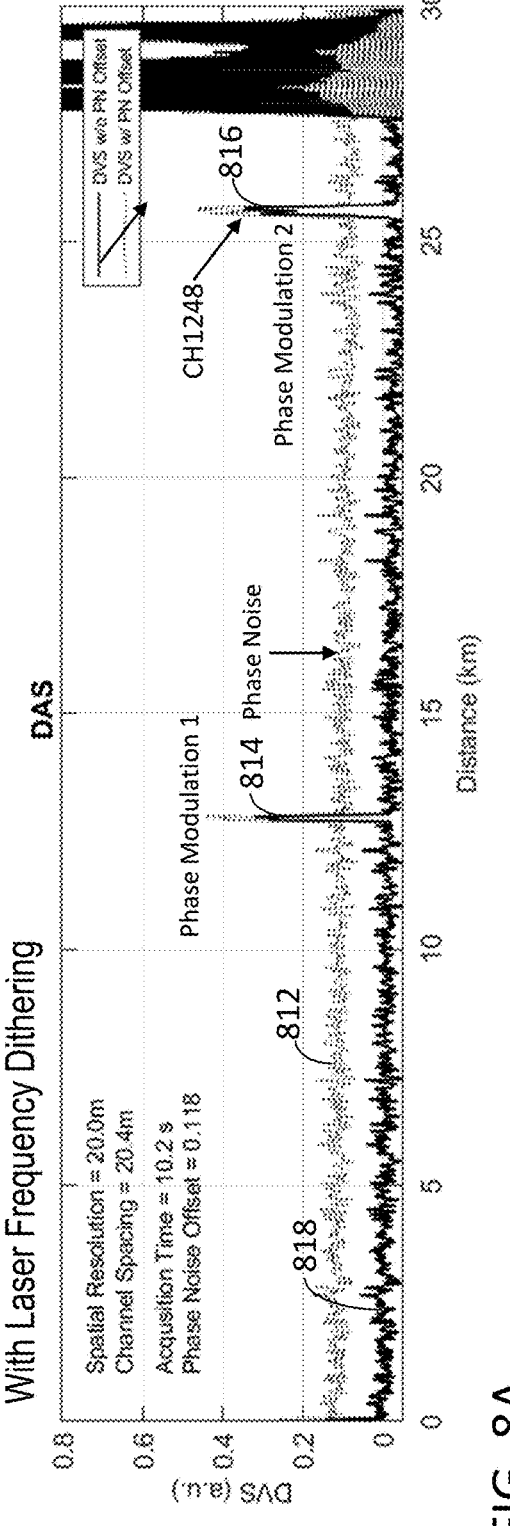
Figure 8B:
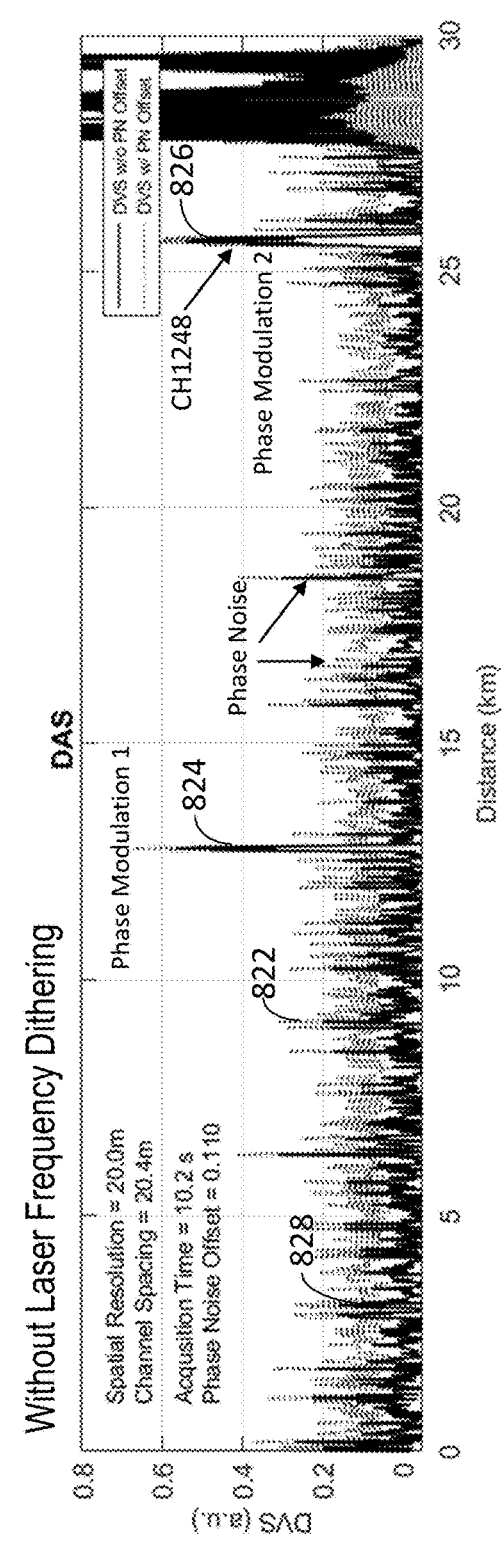

FIG. 8 comprises FIGS. 8A and 8B and shows examples of a FD-DAS signal traces obtained with a DFB laser and averaged over for 150 data groups for about 10 seconds for vibration signals resulting from two fiber stretchers at locations 12.75 km and 25.5 km, wherein FIG. 8A is a graph showing results obtained with a very small current dithering and a very low modulation frequency and wherein FIG. 8B is a graph showing results obtained without any current modulation.

Figure 9:
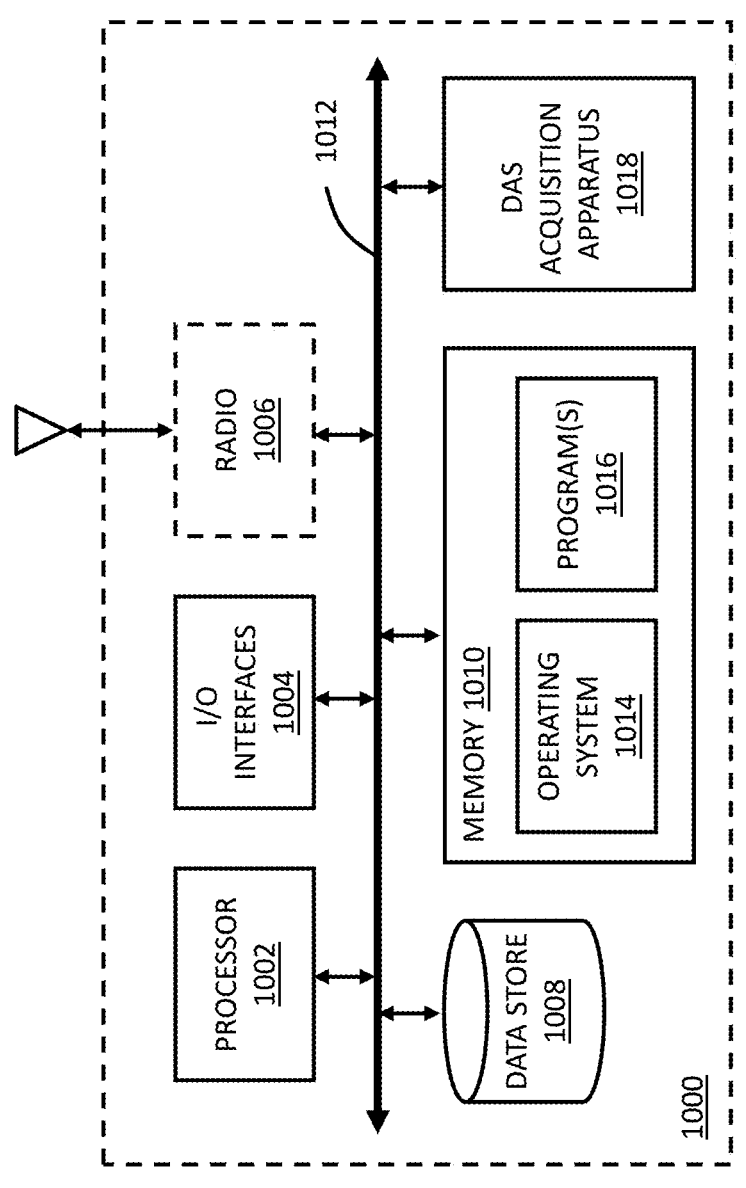

FIG. 9 is a block diagram illustrating an example architecture of a DAS device comprising a DAS acquisition apparatus such as illustrated in FIGS. 1A and 1B.

It will be noted that throughout the drawings, like features are identified by like reference numerals. In the following description, similar features in the drawings have been given similar reference numerals and, to not unduly encumber the figures, some elements may not be indicated on some figures if they were already identified in a preceding figure. It should be understood herein that elements of the drawings are not necessarily depicted to scale, since emphasis is placed upon clearly illustrating the elements and structures of the present embodiments. Some mechanical or other physical components may also be omitted in order to not encumber the figures.

DETAILED DESCRIPTION

Quasi-Continuous and Independent Group Data Signal Processing Measurement Principles:

There are herein provided improved methods and apparatuses for fiber optic distributed acoustic sensing (DAS), notably related to independent group data based quasi-continuous sampled data acquisition and independent group data signal processing for coherent laser Optical Time Domain Reflectometer (OTDR) based fiber optic DAS interrogator, which may enable for using a low-cost commercially available OTDR opto-electronics to provide low-cost and reliable field acoustic and vibration monitoring and measurement that can be employed for the applications of fiber cables monitoring, fiber cable route data collection, and fiber cable troubleshooting for the fiber optic telecommunication networks and/or monitoring third-party interference of the fiber optic perimeter intrusions. An improved fiber optic DAS is therefore used to detect acoustic or vibration signals, wherein the fiber optic DAS may comprise at least one optical fiber deployed in an area of interest or telecommunication network.

The herein-described frequency dithered DAS (FD-DAS) method and apparatus are based on the independent group data signal processing measurement principles and, optionally on quasi-continuous data sampling such as described in co-pending U.S. patent application Ser. Nos. 18/329,133 and 18/390,981 (filed on Jun. 5, 2023, and Dec. 20, 2023, respectively, and hereby incorporated by reference). The basics of such measurement principles are herein described before describing the principles of the frequency dithered DAS (FD-DAS) method and apparatus.

The method and apparatus of low-cost field fiber optic DAS interrogator system apparatus may use commercially available OTDR which uses independent group data based quasi-continuous sampled data acquisition technique, wherein a (user defined, software defined or default) number of coherent laser OTDR traces for each data group are acquired with a minimum delay time between any two neighbored DAS traces, for example 64 DAS traces with any delay time defined by user or advantageously a minimum delay time between any two neighbored DAS traces should be used, which delay is determined by the tested or monitored fiber cable length, and such data group acquisition may be repeated in quasi-continuous sampling mode or in continuous sampling mode with any delay time between any two neighbored data groups, for example such data group data acquisition is repeated for 1,250,000 times or any times defined by user for each data group. In practice, DAS traces are coherent OTDR traces acquired either without any averaging so to obtain a maximum vibration frequency response or with some minimal averaging for gaining more dynamics so to reduce vibration response frequency. For a low-cost reason commercially existing OTDR opto-electronics such as low-cost low performance ADC and FPGA may be directly used for above-described improved DAS system design with minimum modification. The DAS quasi-continuous sampling method may also have less or much less acquired data size for example about 10% to 90% dependent on the design in comparison to a real-time acquisition so that commercially available field industrial computer or field platform host computer may also be used for the DAS signal processing and data saving.

The above-described method and apparatus of field fiber optic DAS interrogator may also be employed optionally to use low-cost low vertical sampling resolution or low bits data sampling devices that are typically used in commercially existing OTDR such as low-cost low bits digitizer (ADC and FPGA). It should be noted that by using low-cost low vertical sampling resolution or low bits data sampling devices may reduce the DAS detection sensitivity but we observed that our DAS system still have an enough detection sensitivity for example of 10 nε to 100 nε DAS detection sensitivity that is sufficient for the acoustic and vibration detection for the most of practical applications such as for fiber cables monitoring, fiber cable route data collection, and fiber cable troubleshooting for fast to locate fiber cable broken point for the telecommunication fiber optics networks.

The method and apparatus of low-cost field fiber optic DAS interrogator for using commercially available OTDR may use independent group data signal processing for data acquired from independent group data acquisition with either quasi-continuous sampling mode or even continuous sampling mode. For example, one group data contains 64 traces or any (user defined, software defined or default) number of DAS traces, and such independent group data signal processing may repeatedly be performed for all N or partial number n of acquired independent group data for N or n times, where $1^{st}$, $2^{nd}$, . . . , $n^{th}$, . . . , $N^{th}$ are all acquired independent group data from quasi-continuous or continuous sampling and $1^{st}$, $2^{nd}$, . . . , $n^{th}$ are partial acquired independent group data from quasi-continuous or continuous sampling.

It should be noted that independent group data acquisition and independent group data signal processing may allow to use a low performance low-noise laser, for example low phase noise and narrow linewidth DFB laser, to save the instrument cost but without decreasing too much DAS interrogator instrument performance, e.g. DAS signal to noise ratio (SNR), because a group data signal processing is used to process multiple DAS OTDR traces e.g. 64 to improve a SNR for the DAS. It should also be noted that independent group data acquisition and independent group data signal processing means that each group data is independent without any influence on any other group data so that the laser frequency and phase stability are only required to be stable enough for a short time period, i.e. an acquisition time for acquiring one group data, for example, 32 ms for acquiring K=64 coherent laser OTDR traces for a sensing optic fiber length of 40 km or less than 50 km. It should be also noted that delay time ΔT between any two groups data (see FIG. 4) may be set by user manually such as from 10% to 90% of an acquisition time for acquiring one group DAS traces or may be a default hardcoded value or a software determined value computer selected according to an OTDR electronics (ADC and FPGA) performance capability including FPGA signal processing, on-board memory, data transferring and saving, etc., for example for setting a ΔT=38 ms for above K=64 group data acquisition time of 32 ms for 40 km to 50 km fiber length.

Furthermore, advantageously independent group data acquisition for the DAS's quasi-continuous sampling mode or continuous sampling mode then independent group data signal processing may lead DAS interrogator more robust and reliable for the field application.

In some embodiments, the above-described methods of quasi-continuous sampled independent data group data acquisition and independent data group signal processing for coherent laser OTDR based fiber optic DAS interrogator may further include one or more of the following steps for the data group-based data acquisition and data group-based signal processing as:

a) providing coherent laser OTDR DAS data group-based data acquisition configuration:

1) setting DAS acquisition configuration by either default or using manual setting such as pulse length, fiber length (so having a coherent laser OTDR acquisition time Δt that may be obtained as two times fiber length divided by a light speed in the optic fiber), monitoring or measurement time, data sampling mode i.e., quasi-continuous or continuous sampling, acquisition mode such as either set as for fiber monitoring or measurement, as well as selecting any other coherent laser OTDR DAS acquisition parameters; or 2) instrument automatically calculating or setting other coherent laser OTDR DAS acquisition parameters such as APD gain, sampling rate, averaging, filtering, time delay St (between coherent laser OTDR traces), group trace number (K), group data time delay ΔT (between data groups), data group number (N), etc.;

b) initialing coherent laser OTDR DAS data acquisition loop for acquiring total N groups of reflectometric traces, each group containing K reflectometric traces with an optional group data time delay ΔT (between data groups), wherein the data acquisition mode may be selected by design or user defined, i.e., either quasi-continuous or continuous sampling;

c) for each group n, performing a coherent laser OTDR DAS data acquisition along the sensing optic fiber cable using a coherent laser OTDR apparatus connected to the optic fiber cable and operating under said coherent laser OTDR acquisition conditions by launching series of coherent laser OTDR pulses, to obtain a group of DAS reflectometric traces e.g., K=64 traces;

d) for each group n, performing a coherent laser OTDR DAS data group-based signal processing as:

1) performing coherent laser OTDR DAS signal processing to obtain Root Mean Square (RMS) difference for each individual group of K DAS traces, i.e., compute $n^{th}$ group data K DAS traces' Root Mean Square (RMS) difference as:

$$\sqrt{\left\langle \Delta P_{(n,\,k)}(z)^2 \right\rangle_K} \quad \text{for the } n^{th} \text{ group data} \tag{1}$$

where $\Delta P_{(n,k)}(z)$ is computed $n^{th}$ group data $k^{th}$ DAS trace difference to a mean power value within each data group as.

$$\Delta P_{(n,\,k)}(z) = P_{(n,\,k)}(z) - \langle P_n(z) \rangle \tag{2}$$

where k=1, 2, . . . , K and n=1, 2, . . . , N, and where $n^{th}$ group data of K DAS traces' mean value $\langle P_n(z) \rangle$ is calculated from, $$\langle P_n(z) \rangle = \sum\nolimits_{k=1}^{K} (P_{(n,\,k)}(z))/K \tag{3}$$

for example, for here for n=1 for $1^{st}$ group data K DAS traces' Root Mean Square (RMS) difference as, $$\sqrt{\left\langle \Delta P_{(1,\,k)}(z)^2 \right\rangle_K} \quad \text{for the } 1^{st} \text{ group data} \tag{4}$$

where P is detected power, z is fiber distance, k is DAS trace number, K is total number of DAS trace in each data group, n group data number, and N is total number of data groups.

2) transferring and saving processed data and displaying DAS signal for the $1^{st}$ and or the $n^{th}$ group DAS reflectometric traces.

e) repeating step c) above to perform coherent laser OTDR acquisitions for N times, e.g., thereby obtaining $1^{st}$ to $N^{th}$ data groups such as N=1,250,000 or any number that is not limited, where each data group contains K, e.g., K=64 or any number that is not limited. For each data group n, step d) above is repeated to perform coherent laser OTDR data group-based signal processing, for example for N times for the $1^{st}$ to $N^{th}$ data groups or k=j−i times ($1<i<j\leq N$) for the $i^{th}$ to $j^{th}$ data groups each containing K DAS reflectometric traces.

In the processing steps described herein, the DAS signal is obtained by calculating a Root Mean Square (RMS) difference $$\sqrt{\left\langle \Delta P_{(n,k)}(z)^2 \right\rangle_K}$$

for each group of K DAS traces. It should however be noted that although the RMS calculation is the conventional method known in DAS processing, such calculation can be replaced by other calculations such as, e.g., a peak-to-peak difference. Other alternative but suitable processing may be used as well. The same comment also applies to other RMS calculations described herein.

In some embodiments, a waterfall graph may be displayed for the DAS computation results using processed k ($k\leq N$) data groups DAS traces' processed results in time domain.

In some embodiments, there may be displayed a histogram of current DAS processed result vs channel number (#) for the processed $n^{th}$ or $N^{th}$ data group DAS traces (e.g., the latest data group) or any $i^{th}$ to $j^{th}$ DAS traces, where typically a channel spacing is a sampling spatial resolution, e.g., 10.2 m or 20.4 m;

In some embodiments, there may be further displayed processed $1^{st}$ to $n^{th}$ (n< or =N) or any $i^{th}$ to $j^{th}$ DAS traces data group DAS signals at one or several user selected fiber locations/positions that are processed results in time domain/series;

In some embodiments, there may be further displayed processed $1^{st}$ to $n^{th}$ (n< or =N) or any $i^{th}$ to $j^{th}$ DAS traces data group DAS signal that are processed results in frequency domain (FFT spectrum) after the fast Fourier transform (FFT) computation for one or several user selected fiber locations/positions.

It is worth noting that the above-described coherent laser OTDR (DAS) can have a long reach of 40 km to over 50 km even up to 100 km measurable or monitorable fiber cable length for using standard well developed commercially available OTDR electronics especially where a well-developed sensitive APD detector from an existed OTDR is directly used. It is also notable that without using any fiber amplifiers e.g., EDFA or fiber Raman amplifier, the above-described coherent laser OTDR can still have a long reach to 50 km to up to 100 km measurable or monitorable fiber length for using standard well developed commercially available OTDR opto-electronics.

Frequency Dithering Principles:

There are herein provided improved DAS methods and apparatuses which use a fiber optic frequency dithered distributed acoustic sensing (FD-DAS) interrogator using group data signal processing and which may use a low-cost commercially available OTDR opto-electronics to provide low-cost, reliable and accurately field acoustic and vibration monitoring and measurement employed for the applications of fiber cables monitoring, fiber cable route data collection, and fiber cable troubleshooting for the fiber optic telecommunication networks and/or monitoring third-party interference of the fiber optic perimeter intrusions. The fiber optic FD-DAS may comprise at least one optical fiber deployed in an area of interest or telecommunication network.

The method and apparatus of low-cost field fiber optic frequency dithered distributed acoustic sensing (FD-DAS) interrogator described herein may be used to improve acoustic or vibration signal measurement quality and fiber location measurement reliability, to allow to use low-cost laser such as DFB laser and/or to suppress polarization fading effect for the DAS's acoustic or vibration measurement and monitoring. The FD-DAS system apparatus may use independent group data based quasi-continuous or continuous sampled data acquisition and independent group data signal processing technique. The FD-DAS's CW coherent laser's optical frequency (or, equivalently, optical phase or laser wavelength) can be controlled in an evenly or randomly distributed manner for different FD-DAS data groups, but they are kept constant or with negligibly variation for every coherent laser OTDR FD-DAS traces within any data group. For example, a user defined number of DAS traces, e.g., 64 traces for each data group are acquired, where each FD-DAS trace, i.e. 64 traces, in each data group has a substantially constant coherent optical frequency or negligible frequency drifting of, i.e., ideally $\delta f \sim 0$, or said to have a minimum laser light phase or laser frequency variation. But for different FD-DAS data groups, the FD-DAS's CW coherent laser's optical frequency may be controlled to have different values in an evenly or randomly distributed manner, e.g. with an optical phase step of 0.01 radian to 1 radian or a wavelength step of 0.01 pm to 1 nm. A time delay between any FD-DAS traces within the same data group may be selected to be as minimum time delay or any delay time defined by a test fiber length. However, one may also use a larger time delay between any two-neighbor data groups so as to enable easily to set a large difference for laser optical frequency or optical phase for each data group.

In some embodiments, the FD-DAS data group acquisition may be repeated in quasi-continuous sampling mode or in continuous sampling mode with any user defined laser optical frequency or phase step between any two neighbored data groups.

In some other embodiments, a laser optical frequency or phase step may be achieved by using a simple control of slow scanning laser wavelength either by slow small laser temperature modulation or by slow small laser current modulation or by externally to control laser optical frequency or phase from a phase/frequency modulator e.g., a fiber stretcher or a frequency modulator. For example, group data acquisitions are repeated for 1,250,000 times or any repeated times defined by user for each data group containing any DAS traces e.g., 64 DAS traces.

For a low-cost reason, commercially existing OTDR opto-electronics such as low-cost low performance ADC and FPGA may be directly used with minimum modification. Then the DAS interrogator data acquisition method as illustrated in FIG. 5 flowchart 400 may be directly used but still having an enough FD-DAS acoustic or vibration detection sensitivity for the applications such as for fiber cables monitoring, fiber cable route data collection, and fiber cable troubleshooting for fast to locate fiber cable broken point for the telecommunication fiber optics networks.

Above-described FD-DAS data acquisition may have much less acquired data size such as about 10% to 90% in comparison to a real-time DAS data acquisition so that commercially available field industrial computer or field platform host computer can also be used for the FD-DAS signal processing and data saving.

The herein-described frequency (or phase) dithered DAS (FD-DAS) method and apparatus are based on the independent group data signal processing measurement principles and, optionally on quasi-continuous data sampling such as described in co-pending U.S. patent application Ser. Nos. 18/329,133 and 18/390,981 (filed on Jun. 5, 2023, and Dec. 20, 2023, respectively, and hereby incorporated by reference). The DAS interrogator described in these co-pending patent applications can be used to apply the frequency (or phase) dithered DAS (FD-DAS) method and apparatus, with some modifications to allow to tune the coherent laser optical frequency or phase during group data acquisitions.

The method and apparatus of low-cost field fiber optic frequency dithered distributed acoustic sensing (FD-DAS) interrogator for using commercially existed OTDR may be used to improve DAS signal and event location measurement accuracy and reliability by averaging several measured FD-DAS signals over, e.g., 10 to 100 data groups or as many data group measurements as desired over different coherent laser optical frequencies or phases. The coherent laser optical frequency or phase for the FD-DAS may be set or tuned under either user defined value or function or in evenly or randomly distributed manner or modulation. For example, such different optical frequencies can be obtained by slowly modulating laser diode current or slowly adjusting laser diode temperature or by setting user defined laser frequency or optical phase e.g., externally from an external phase modulator during the FD-DAS group-based acquisitions. For example, in some embodiments, the coherent laser optical phase of the FD-DAS may be set in an even distribution such as to set six optical phases as $$\left[0, \frac{1}{3}\pi, \frac{2}{3}\pi, \pi, \frac{4}{3}\pi, \frac{5}{3}\pi\right]$$

for six data group acquisitions or three optical phases as $$\left[0, \frac{2}{3}\pi, \frac{4}{3}\pi\right]$$

for three data group acquisitions or like. It is noted that because a phase modulator may allow to distribute the phase in an even manner, the FD-DAS signals may be averaged over a fewer number of optical phases (3 to 6 data groups) when compared to optical frequency dithering (10 to 100 data groups). Of note is that yet an even distribution of the optical frequency may not easily provide such evenly distributed optical phases.

The method and apparatus of low-cost field fiber frequency dithered distributed acoustic sensing (FD-DAS) interrogator may allow to improve a FD-DAS signal noise ratio (SNR) to measure and monitor long fiber cable by using long pulse even if long light pulses (e.g. 800 ns) have more phase noise than short light pulses (e.g. 100 ns), wherein measurements of acoustic or vibration signal and event location may be achieved by averaging several measured FD-DAS signals for example 10 to 100 or as many measurements as desired over different coherent laser frequencies or optical phases. For example, OTDR pulse width over 50 ns up to 10,000 ns may be used.

The method and apparatus of low-cost field fiber optic frequency dithered distributed acoustic sensing (FD-DAS) interrogator may allow using low-cost single-frequency laser with significant phase or frequency noise such as a low-cost DFB laser by averaging several measured FD-DAS traces for example 10 to 100 or as many measurements desired over different coherent laser frequencies or phases. For such applications, the coherent laser optical frequency or phase of the FD-DAS may be set or tuned under either user defined value or function, may be distributed in an even or random manner, or be modulated during the FD-DAS group-based data acquisitions.

The method and apparatus of low-cost field fiber optic frequency dithered distributed acoustic sensing (FD-DAS) interrogator may include suppressing polarization fading effect on the acoustic or vibration monitoring and measurement. Polarization fading suppression may be achieved by either averaging several measured FD-DAS signals, for example 10 to 100 or as many measurements as desired over different coherent laser frequencies or optical phases or using long pulse for example for using OTDR pulse from 50 ns up to 10,000 ns. For suppressing polarization fading effect advantageously a larger laser optical frequency separation may be used such as for example having a wavelength difference of 0.08 nm to 0.4 nm or frequency difference of 10 to 50 GHz between any neighbored data groups and also having different laser wavelengths or optical frequencies for any data group for the FD-DAS data group data acquisitions. For example, over the C-band wavelengths between 1530 nm and 1565 nm, DAS acquisitions may be performed for 36 FD-DAS data groups with 36 different wavelengths ranging from 1530 nm to 1565 nm, with a wavelength step of 1 nm.

It is also noted that without using any fiber amplifiers such as EDFA and Raman fiber amplifier the above described frequency dithered distributed acoustic sensing (FD-DAS) may provide a reliable and accurate acoustic or vibration measurement or monitoring result for a long length sensing fiber cable of up to, e.g., 50 km to 100 km by using commercially available OTDR opto-electronics operating with an OTDR pulse width of, e.g., from 50 ns to 5 us and a properly selected sampling bandwidth.

The applications of the FD-DAS may comprise:
  improving acoustic or vibration signal measurement reliability and acoustic or vibration signal location measurement accuracy,
  allowing to use single-frequency laser with high phase or frequency noise such as low-cost DFB laser, and/or
  suppressing polarization fading effect.
Implementations and Results Now referring to the drawings, FIG. 1A is a simplified schematic representation of coherent laser OTDR frequency dithered DAS (FD-DAS) acquisition apparatus 200 in accordance with one embodiment which comprises a tunable wavelength or dithered optical frequency coherent laser 11. FIG. 1B illustrates another embodiment of a frequency dithered DAS (FD-DAS) acquisition apparatus 202 which employs an optical phase modulator 15. For example, the optical phase modulator 15 may implemented using a fiber stretcher or an optical phase modulation device.

The FD-DAS acquisition apparatuses 200, 202 typically connect to a sensing optical fiber cable 100 of an optical fiber network which may be monitored and tested according to implementations of the present method. The optical fiber cable 100 may be embodied by a portion of an optical fiber network which may be a long-distance telecommunication network, a Passive Optical Network (PON) or a Local Area Network (LAN). It will be further understood by one skilled in the art that while the examples below are given within the simplified context of a single fiber 100, the herein-described embodiments may be adapted to point-to-multipoint networks, such as, e.g., Passive Optical Networks (PONs).

The FD-DAS acquisition apparatuses 200, 202 comprises a coherent OTDR for performing repetitive DAS acquisitions. Each DAS acquisition is performed by propagating in the optical fiber link, a pulsed test signal 19 and detecting corresponding return light from the optical fiber link 10 so as to obtain a DAS trace representing backscattered and reflected light as a function of distance in the optical fiber link 100.

As illustrated in FIG. 1A, the FD-DAS apparatus may comprise a coherent tunable wavelength or frequency dithered CW coherent laser OTDR. Whereas in other embodiments as illustrated in FIG. 1B, the FD-DAS apparatus may comprise a CW coherent laser having a fixed wavelength (or fixed optical frequency), followed by an optical phase modulator 15 such as a fiber optic stretcher.

In the embodiment of FIG. 1A, the FD-DAS apparatus 200 comprises a tunable wavelength or optical frequency dithered CW coherent laser 11 which employs a low-noise laser with low phase noise and low frequency noise and narrow laser linewidth. The FD-DAS apparatus 200 further comprises a manually adjustable variable optical attenuator MVOA 14 that adjusts an input laser power level to the semiconductor optical amplifier (SOA) 18. It is worth noting that if the SOA 18 is a polarization sensitive SOA, then CW coherent laser 11 and MVOA 14 should be made with polarization-maintaining optical fiber (PMF or PM fiber). Optical router 22 may comprise either an optical circulator or fiber coupler, such as 3-dB (50/50) coupler (or other split ratio). The receiver 32 may comprise an Avalanche Photo-Diode (APD) light detector.

As will be readily understood by one skilled in the art, the coherent optical frequency dithered or wavelength tunable laser OTDR FD-DAS apparatus 200 of FIG. 1A may be modified such as illustrated in FIG. 1B. The embodiment of FIG. 1B comprises a coherent laser OTDR FD-DAS apparatus 202 employing a fixed frequency coherent CW laser 13 followed by an optical phase modulator 15 e.g., a fiber stretcher. FD-DAS acquisition apparatus 200 and FD-DAS acquisition apparatus 202 both enable to use commercially available OTDR opto-electronics, for example, to carry out the described monitoring, test and measurement method. The FD-DAS acquisition apparatuses 200 or 202 are both connectable at the proximal end 24 of the optical fiber link 100 and are configured to perform a plurality of FD-DAS acquisitions along the fiber link 100.

The FD-DAS acquisition apparatuses 200 or 202 may be embodied by any assembly of components and devices to perform FD-DAS acquisitions. For example, the FD-DAS acquisition apparatuses 200 or 202 comprises a light generating assembly that includes a CW coherent tunable laser 11 that can tune or set the laser frequency difference or a fixed wavelength CW coherent laser 13 followed by an external phase or frequency modulator 15 that can set laser optical phase or frequency difference. The FD-light generating assembly further comprises a manually adjustable variable optical attenuator (MVOA) 14 (not shown in FIG. 1B), a semiconductor optical amplifier (SOA) 18, and OTDR pulse generator electronics and control box 34, for example embodied by a CW coherent tunable laser 11, 13 driven by a CW stable current with temperature controller and a pulse generator and control box 34 to generate current pulse to modulate SOA 18 to generate coherent tunable laser light pulses forming a pulsed test signal 19 having the desired coherent light nature pulse characteristics that may be incident into sensing fiber 100 via at the proximal end 24 of the optical fiber link 100 for detecting any acoustic or vibration signal from the sensing fiber 100.

In some embodiments, the light generating assembly may be adapted to generate coherent light pulses having different pulse widths, for example through a proper control of the pattern produced by the pulse generator electronics and control box 34. In the embodiment of FIG. 1B, the light generating assembly is adapted to generate light pulses having different optical phases, for example by external phase modulator 15. The light generating assembly may also combine both pulse width and wavelength or optical phase controlling capabilities. Of course, different and/or additional components may be provided in the coherent light generating assembly, such as an isolator, an in-line polarizer, polarization maintaining fiber, and the like.

Such as described above, the control box 34 is configured to tune the coherent laser 11 frequency or wavelength for a wide wavelength range or control coherent light phase via external phase or frequency modulator/controller 15 between any two neighbored data groups or with a control of slow small scanning laser wavelength by either slowly small laser temperature modulation or laser current or phase or frequency modulator, such that FD-DAS traces in each same data group has a substantially fixed coherent laser frequency, i.e. have a negligible frequency drifting. It is worth noting that the larger the laser frequency difference between different data groups, the better will the acoustic or vibration signal measurement quality be improved, the more reliable will be the fiber location measurement, and more efficiently will the polarization fading effect be suppressed. Similarly, better measurements will be obtained for a coherent laser having a fixed or negligible shift of the optical frequency over a period for acquiring one data group (for example one data group containing K OTDR traces, where K=64 or any other number).

In some embodiments, the CW coherent laser's optical frequency or phase may be controlled in evenly or randomly distributed for different data groups but kept mostly constant or with negligibly variation for every coherent laser OTDR FD-DAS trace within each group data.

As in FIGS. 1A and 1B, the coherent frequency dithered or tunable wavelength or phase controlled light pulse output from SOA 18 is coupled to the sensing optical fiber link 100 through an optical router 22 such as, for example, a circulator or a 50/50 coupler, having three or more branches 81, 82, 83. The first branch 81 is connected to the SOA 18 to receive the coherent tunable laser light pulses therefrom, the optical router 22 outputting these pulses to the second branch 82 which is connected to the optical fiber 100. The second branch 82 also receives the return light signals from the optical sensing fiber 100, which is circulated and outputted to the third branch 83. The third branch 83 is connected to an appropriate receiver/detecting module 32, for example an avalanche photodiode (APD), which detects the return coherent laser light signal for each test coherent light pulse.

In the illustrated embodiments, the detected signals are amplified by an electronic amplifier (not shown in FIGS. 1A and 1B) and then converted from analog to digital by a converter for the FD-DAS signal processing in the FPGA then transferring acquired or processed FD-DAS data to the host computer or similar, for example, field platform for test modules, for further signal processing with high level software.

It is also be noted that the MVOA 14 (not shown in FIG. 1B) may be used to adjust the incident light power into the SOA 18. The MVOA 14 (inserted between the CW coherent 11, 13 and the SOA 18) may also be used as an ON/OFF switch for the light generating assembly to avoid any "live" fiber OTDR testing. In some embodiments, an ON/OFF switch having a light power ratio above 50 to 60 dB, and ideally close to 70 dB, may be obtained using such a MVOA 14.

The wavelength tunable or frequency dithered or optical phase controllable coherent laser OTDR FD-DAS apparatus 200 or 202 of in FIG. 1A and FIG. 1B may further includes a pulse generator and control box 34 having functions of pulse generation, control and communication, data acquisition and signal processing that is schematically and conceptually illustrated as control box 34 in FIGS. 1A and 1B. The pulse generator and control box 34 may include one or more computer programs instructing a processor or processors to perform the method as described above. In the illustrated embodiment, the pulse generator and control unit 34 includes a FD-DAS data acquisition and signal processing module for acquiring then simultaneously processing the detected return light signals from the sensing optical fiber 100 in real-time mode. In the illustrated embodiments, the FD-DAS data acquisition and signal processing inside a pulse generator and control box 34 integrates signal processing and trace analysis hardware and software. The pulse generator and control box 34 may be embodied by components such as ADC, FPGA or the like, software, and may also be integral or external to the FD-DAS apparatus 202 such as a host computer or platform based industrial computer. The pulse generator and control box 34 may perform coherent laser optical frequency control to adjust or tune the laser wavelength, real-time data acquisitions, data calculations and signal processing, necessary for monitoring or testing acoustic or vibration along the optical fiber link 100. It is noted that the FD-DAS interrogator data acquisition method illustrated in FIG. 5 flowchart 400 may be directly used while still providing enough FD-DAS acoustic or vibration detection sensitivity for applications such as for fiber cables monitoring, fiber cable route data collection, and fiber cable troubleshooting for fast to locate fiber cable broken point for the telecommunication fiber optics networks. It is worth noting that the fewer bits the digitizer has (ADC and FPGA), the less sensitive is the DAS acoustic or vibration detection.

The FD-DAS apparatus 200, 202 as illustrated embodiment in FIG. 1A and FIG. 1B may be implemented to include an external memory, host computer data storing, cloud data storing, signal display, warning alarm, and the like in communication with the pulse generator and control box 34.

Figure 2A:
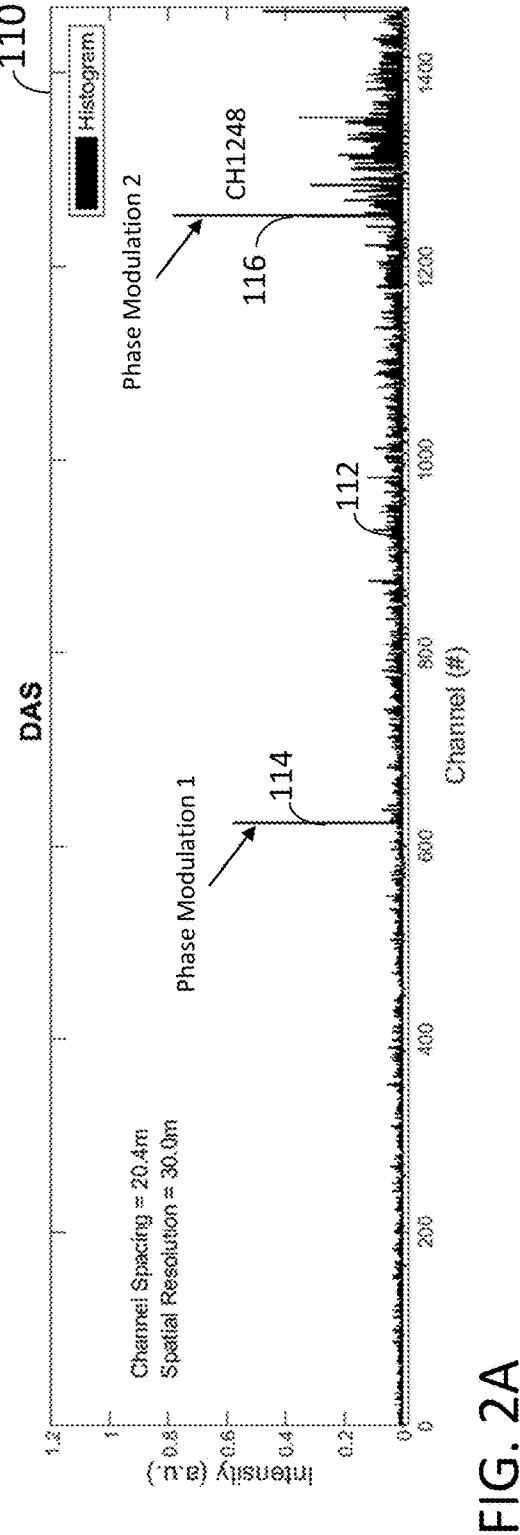
Figure 2B:
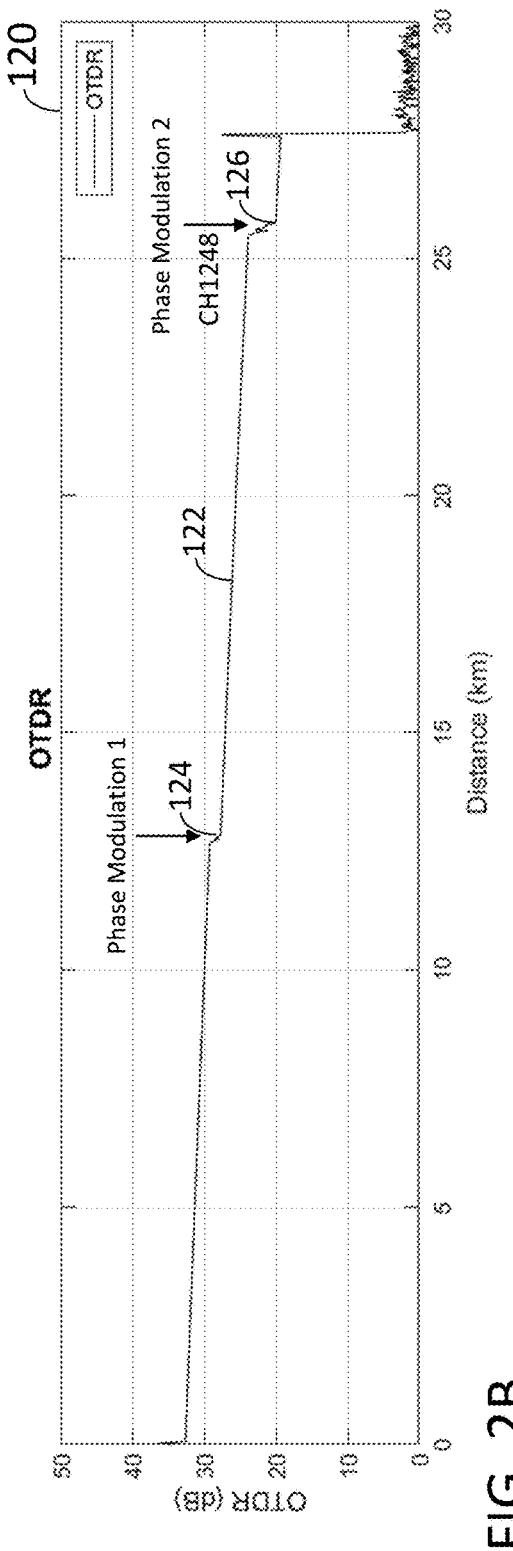
FIG. 2B is an exemplary OTDR reflectometric trace acquired using a broadband light source.

FIGS. 2A and 2B illustrate an example of FD-DAS results that may be obtained using a FD-DAS apparatus 200, 202 such as illustrated embodiment in FIG. 1A and FIG. 1B. FIG. 2A shows a FD-DAS signal processed trace for one data group according to one example that shows two vibration signals. In this example, the two vibration signals are produced by two fiber phase modulators, i.e., fiber stretchers positioned along the sensing optic fiber cable 100 at locations of 12.75 km and 25.5 km, respectively. The FD-DAS results as shown in FIG. 2A is a FD-DAS signal processed trace derived from one group data by computing its root-mean-square (RMS) difference as described herein above. FIG. 2B shows an OTDR reflectometric trace as measured using a broad-band light source towards the same sensing optic fiber cable 100.

Figure 3A:
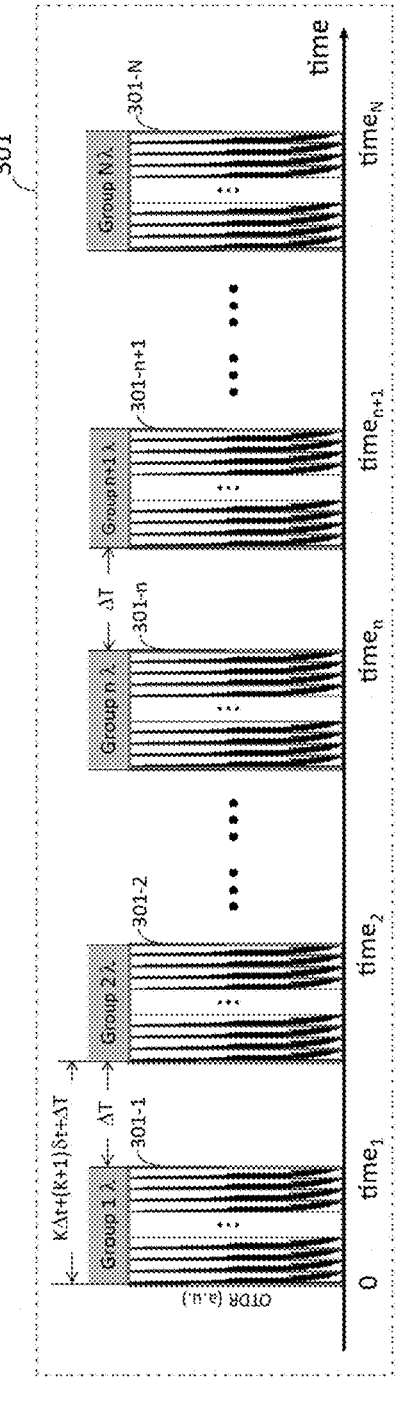
Figure 3B:
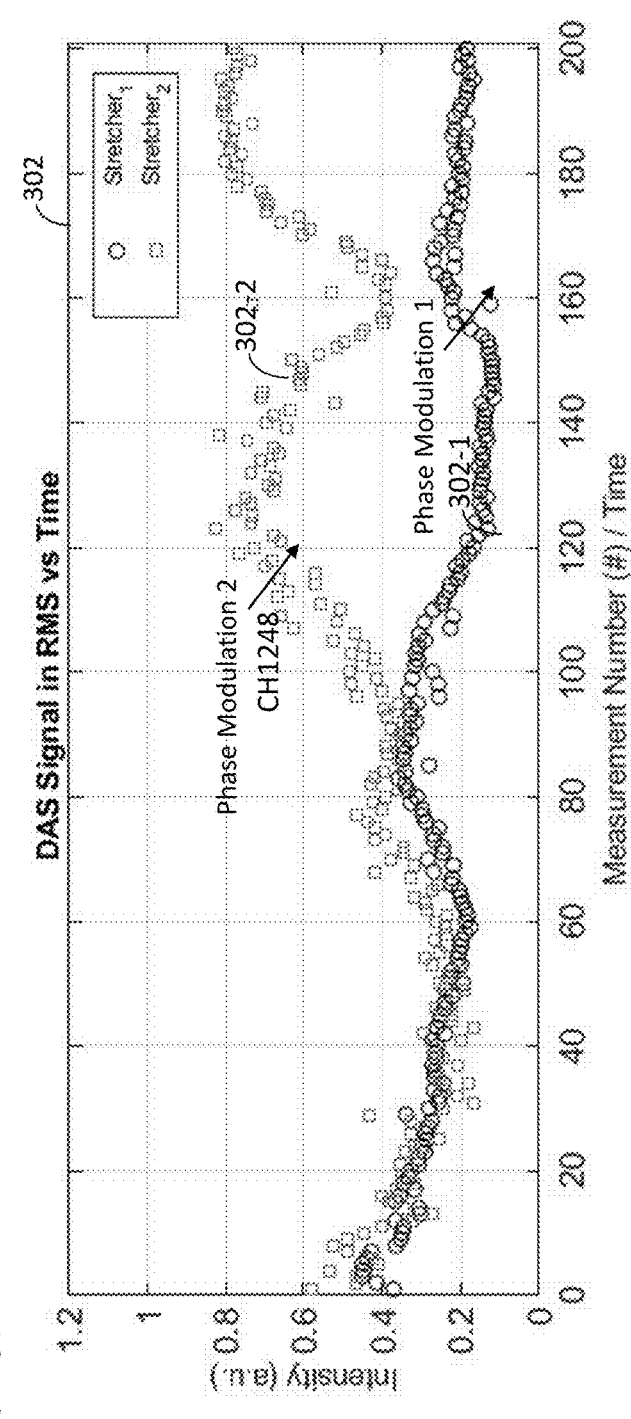
FIG. 3B is a graph showing a DAS vibration signal as a function of time resulting from the acquisition illustrated in FIG. 3A, for two fiber stretchers connected to sensing optic fiber link at locations of 12.75 km and 25.55 km, respectively, in accordance with one embodiment.

FIG. 3 illustrates a low-cost field fiber optic non-frequency dithered distributed acoustic sensing (DAS) method which uses a quasi-continuous data sampling and group-based data acquisition technique as described above and more thoroughly in co-pending U.S. patent application Ser. Nos. 18/329,133 and 18/390,981 (filed on Jun. 5, 2023, and Dec. 20, 2023, respectively, and hereby incorporated by reference). In the DAS acquisition illustrated in FIG. 3, group data acquisitions are repeated for to acquire many groups of DAS traces at different time but at the same laser optical frequency (or wavelength) of the coherent laser. FIG. 3B shows the results of a DAS signal processing based the DAS acquisitions illustrated in FIG. 3A, which shows acquired DAS vibration signal versus time for many DAS data groups at one fixed laser optical frequency for the DAS CW coherent laser. FIG. 3B shows DAS signals from one group data to another group data varies significantly due to the DAS laser optical phase or laser frequency or any other potentially relevant drifting from the DAS interrogator. Such variation is unpredictable and therefore undesired. FIGS. 4A and 4B illustrate the fiber optic frequency dithered distributed acoustic sensing (FD-DAS) method which uses a quasi-continuous data sampling and group-based data acquisition technique as described hereinabove. Here again, the FD-DAS method uses a quasi-continuous data sampling and group-based data acquisition technique as described above and more thoroughly in co-pending U.S. patent application Ser. Nos. 18/329,133 and 18/390,981 (filed on Jun. 5, 2023, and Dec. 20, 2023, respectively, and hereby incorporated by reference). But in FIGS. 4A and 4B, optical frequency dithering is applied.

The FD-DAS measurement principles are illustrated in FIGS. 4A and 4B. FIG. 4A shows a schematic representation of FD-DAS group data acquisitions using coherent laser optical frequency tuning or dithering or optical phase setting or modulating, wherein groups of OTDR data 306-$n$ ($n=1$, 2, . . . , n, . . . , N) are acquired with varied optical frequencies (or wavelengths $\lambda_n$ ($n=1, 2, \ldots, n, \ldots, N$)) or optical phase of the coherent laser OTDR. FIG. 4B shows a schematic representation of data acquisitions for many data groups 306-$n$ ($n=1, 2, \ldots, n, \ldots, N$) where each data group contains many coherent laser OTDR traces 305-$k$. In the illustrated embodiment, the FD-DAS apparatus uses quasi-continuous data sampling and group data acquisition technique 306-$n$ ($n=1, 2, \ldots, n, \ldots, N$), so that commercially existing OTDR opto-electronics such as low-cost low performance ADC and FPGA may be used with minimum modification as well having much less acquired data (such as about 10% to 90% less) in comparison with a real-time acquisition, so that commercially available field industry computer or field platform may be used for the FD-DAS signal processing and data saving. For example, conventional OTDR data acquisition as known in the art may be used but without any averaging (i.e., real-time data acquisition) to acquire each group real time coherent laser OTDR FD-DAS traces as shown in 306-$n$ of FIG. 4A for K no averaging or averaging one (1) real-time FD-DAS traces 305-1, 305-2, . . . 305-$k$, . . . , 305-K with approximately same coherent laser optical frequency or optical phase. Such FD-DAS OTDR traces 305-1, 305-2, . . . 305-$k$, . . . 305-K provide one group data (e.g. for K=64) as illustrated in box 306-$n$ of FIG. 4A, and then such group data acquisition is repeated N times with a delay time $\Delta T$ as shown in box 308 of FIG. 4B, for example, $\Delta T=38$ ms (or any user defined value) and N=1,250,00 for one day 24 hours real-time FD-DAS monitoring for a monitoring fiber length of 50 km for example, for $\Delta t=0.5$ ms with a small time delay between traces of 0.005 ms to have an acquisition time of 32.032 ms for acquiring 64 DAS traces. As shown in FIG. 4A each coherent laser OTDR trace has the same laser wavelength $\lambda_n$ (or laser frequency) or has negligible drifting. However, in FIG. 4B, each group containing K coherent laser OTDR traces have a different laser wavelength (or laser frequency). Ideally, such differences of laser wavelengths (or laser frequencies) may be set as large as possible. The different laser wavelengths (or laser frequencies), may be set in an evenly or randomly distributed manner for different data groups, but they are kept as constant or with negligibly variation for every coherent laser OTDR FD-DAS trace within one data group.

It is noted that such frequency dithered distributed acoustic sensing (FD-DAS) apparatus 200 and 202 as illustrated in FIGS. 1A and 1B without using any fiber amplifiers can have a long reach to 20-50 km even to 100 km measurable or monitorable fiber length for using a standard well developed commercially available OTDR opto-electronics especially where a highly sensitive APD detector from OTDR is directly used with a properly detection bandwidth and an OTDR pulse e.g., from 50 ns to 5 us and a sampling bandwidth from an existed OTDR are properly selected accordingly.

With reference to FIGS. 4A and 4B, the frequency dithered distributed acoustic sensing (FD-DAS) interrogator including the method of independent group data signal processing for low-cost field fiber optic FD-DAS interrogator for group data acquisition 306-*n* from quasi-continuous data sampling 308 with a delay time $\Delta T$ between each two group data allows to use a low-cost low-noise single-frequency DFB laser for the CW coherent laser 11 or 13 to save the instrument cost. It is however noted that the frequency dithered distributed acoustic sensing (FD-DAS) principles described herein may be equivalently applied to group data acquisitions obtained from continuous data sampling, i.e., without delay time $\Delta T$ between groups.

FIG. 5 is a flowchart 400 illustrating a FD-DAS method which provides independent data group-based DAS data acquisition configurations 402 and 404 for using coherent laser OTDR, in accordance with one embodiment. As shown in the flowchart, the method of FIG. 5 defines two imbricated coherent laser OTDR FD-DAS data acquisition loops for acquiring a total of N averaged FD-DAS points, each averaged FD-DAS point n being based on I averaged groups (or I FD-DAS signals) and each group containing K reflectometric traces. In the embodiment of FIG. 5, optical frequency or optical phase dithering is applied continuously while looping such that the optical frequency or optical phase varies in-between groups I of DAS traces while remaining substantially constant within each said group. As explained herein above, in other embodiments, the optical frequency and optical phase may be tuned in steps in-between groups (e.g., at step 426).

In step 402, the instrument sets the FD-DAS acquisition configuration by either default, automatic or using manual settings. For example, such settings may include pulse length, fiber length (so having a coherent laser OTDR acquisition time $\Delta t$ defined as two times fiber length divided by a light speed in the fiber), monitoring or measurement time, data sampling mode i.e., quasi-continuous or continuous sampling, data acquisition mode either for a long time fiber cable or fiber network monitoring or for a short time period for the fiber test & measurement and troubleshooting.

In step 404, the instrument may also automatically calculate or select other coherent laser OTDR FD-DAS acquisition parameters such as APD gain, sampling rate, time delay $\delta t$ (between coherent laser OTDR traces), group trace number K, group data time delay $\Delta T$ between any two neighbor data groups, number I of averaged FD-DAS signals and total number N of averaged FD-DAS points that may be calculated from user set or selected monitoring or measurement time for example as in the embodiment illustrated in FIGS. 4A and 4B but not limited.

In step 408, the instrument sets optical frequency or optical phase dithering parameters (modulation amplitude and frequency) and the number I of averaged groups by either default, automatic or using manual settings.

In step 410, the instrument initializes the coherent laser OTDR FD-DAS data acquisition loop (starting with n=1 and i=1) for acquiring a total of N averaged FD-DAS points, each averaged FD-DAS point n being based on I averaged groups and each group containing K reflectometric traces with a group data time delay $\Delta T$ between any two neighbor data groups and selecting or user defining data acquisition mode, i.e., either quasi-continuous or continuous sampling mode as shown in FIGS. 4A and 4B.

In step 412, the instrument performs repetitive coherent OTDR DAS acquisitions while dithering the optical frequency or optical phase to obtain a FD-DAS group data of K reflectometric traces. For each group n-i, the instrument performs coherent laser OTDR DAS independent data group-based data acquisitions along the fiber cable using a coherent laser OTDR apparatus as illustrated embodiment in FIG. 1A or 1B connected at the proximal end of the optical fiber cable and operates under said coherent laser OTDR (DAS) acquisition conditions by launching series of coherent laser OTDR pulses, to obtain a group of DAS reflectometric traces (as shown in FIG. 4A 305-1 to 305-K) where each data group containing K=64 traces represents a proximal portion of the optical fiber cable.

In step 414, for group n-i, the instrument performs independent data group-based DAS signal processing by using above acquired data groups from coherent laser OTDR FD-DAS. The instrument performs a signal processing method as such described above in section MEASUREMENT PRINCIPLES for steps 1, 2 to obtain a DAS signal for each group n-i.

In steps 415 and 416, previous steps 412 and 414 are repeated for each group i up to i=I.

In step 418, DAS signals obtained in 414 for i=1 to I are averaged to obtain FD-DAS signal n.

In step 420, processed data may be transferred and/or saved and FD-DAS signals obtained so far may be displayed to the user.

In steps 422, 424 and 426, previous steps 412, 414, 415, 416, 418 and 420 are repeated for each group n up to n=N.

FIG. 6A (a1-a4) show examples of maximum envelope computation for frequency dithered FD-DAS interrogator reflectometric histograms from many data groups such as for 10 to 100 data groups for FD-DAS using OTDR pulse width of 100 ns, 400 ns, 800 ns and 900 ns, respectively, under different laser frequencies for different data groups for one fiber stretcher connected to sensing optic fiber link 100 at a location along 12.75 km with an applied voltage of 5V and a modulation frequency of 80 Hz according to one example. These graphs show the DAS signal intensity as associated with each DAS channel (Channel #), wherein each channel represents a position along the sensing optical fiber link 100. For example, a channel spacing may be a sampling spatial resolution, e.g., 10.2 m. The arrow over channel CH1248 indicates the actual location of the fiber stretcher, i.e., the target vibration location to be measured.

FIG. 6B (b1-b4) show examples of single computation for DAS reflectometric histogram from one data group using OTDR pulse width of 100 ns, 400 ns, 800 ns and 900 ns, respectively, at one fixed wavelength for one fiber stretcher connected to sensing optic fiber cable at a location of 12.75 km with an applied voltage of 5V and a modulation frequency of 80 Hz according to one implementation. For example, FIG. 6A (a1) indicates that the FD-DAS may provide more accurate location measurement result (see arrow position in FIG. 6A (a1) versus a measurement obtained with a short pulse as shown in FIG. 6A (a4)) from the FD-DAS measurement by using a long pulse (e.g., 900 ns) in order to reach a long fiber sensing distance. However, FIG. 6B (a1) indicates a conventional DAS has large measurement location error (also see arrow position in FIG. 6B (a1) versus a measurement obtained with a short pulse as shown in FIG. 6B (b4)) due to phase difference at different optical channels. This means a conventional DAS by using long pulse will produce a larger measurement error for the fiber vibration event location, whereas the FD-DAS may provide very accurate fiber vibration event location measurement.

FIG. 7A (a) shows examples of averaged frequency dithered FD-DAS RMS signals 624, 625 over 40 to 80 data groups with different vibration strengths for a fiber stretcher with different applied levels of modulation voltages on the fiber stretcher PZT connected at fiber location along 12.75 km. 40 to 80 different data groups 623 were acquired at different times with different coherent laser wavelengths for an OTDR pulse 100 ns for one fiber stretcher connected to sensing optic fiber cable at a location along 12.75 km. FIG. 7B shows the distribution of mean FD-DAS RMS signals after 10 averaging for 10 different coherent laser wavelengths for one fiber stretcher connected to sensing optic fiber cable at a location along 12.75 km with an applied voltage of 5V and a modulation frequency of 80 Hz. FIG. 7C shows the distribution of FD-DAS RMS signals without any averaging over different data groups regarding the coherent laser wavelength for one fiber stretcher connected to sensing optic fiber cable at a location along 12.75 km with an applied voltage of 5V and a modulation frequency of 80 Hz. FIG. 7B and FIG. 7A 624 demonstrate that the stability of a DAS signal is highly improved after an averaging over several FD-DAS traces (e.g., 10) obtained with different optical frequencies.

FIG. 8A shows an example of FD-DAS signal processed trace averaged over for 150 data groups for an acquisition time about 10 seconds that shows two vibration signals 814, 816 from two fiber phase modulators i.e., two fiber stretchers being connected to sensing optic fiber link 100 at locations along 12.75 km 814 and along 25.5 km 816, respectively, in which a low-cost slightly high optical phase noise single-frequency DFB laser is used for the FD-DAS interrogator and is controlled under a very small current dithering, i.e., 50 mV modulation amplitude and modulation frequency 0.001 Hz or 0.002 Hz. In FIG. 8A for using a low-cost high phase noise DFB with current modulation being set as described above for the FD-DAS instrument, a dashed line 812 is a processed FD-DAS trace with an observed averaged phase noise level of 0.118 and the solid trace 818 is the FD-DAS trace which subtracts a phase noise level of 0.118. As will be appreciated from FIG. 8A, the FD-DAS interrogator under DFB laser small current modulation may produce clearer vibration signals with high SNRs for measured acoustic or vibration events. However, FIG. 8B shows an example of DAS signal obtained using the same low-cost high phase noise DFB without any current modulation being used for the FD-DAS instrument. In FIG. 8B, a conventional DAS signal processed trace is obtained without any frequency dithering from laser driver current modulation but using averaging over 150 data groups for about 10 seconds. It shows two vibration signals 824, 826 from two fiber phase modulators. The dashed line 822 is a processed conventional DAS trace with an averaged phase noise level of 0.11 and the solid trace 828 is the conventional DAS trace which subtracts a phase noise level of 0.11. As will be appreciated from FIGS. 8A and 8B, the SNR is greatly improved using the FD-DAS method. Advantageously a low-cost DFB laser-based FD-DAS interrogator under DFB laser small current modulation may produce clearer vibration signals with high SNRs (see FIG. 8A), for measured acoustic or vibration events.

Example of DAS Device Architecture

FIG. 9 is a block diagram of a DAS device 1000 which may comprise a DAS acquisition apparatus 200 such as illustrated in FIG. 1A, 1B or 2. The DAS device 1000 may comprise a digital device that, in terms of hardware architecture, generally includes a processor 1002, input/output (I/O) interfaces 1004, an optional radio 1006, a data store 1008, a memory 1010, as well as an optical test device including an DAS acquisition device 1018. It should be appreciated by those of ordinary skill in the art that FIG. 9 depicts the DAS device 1000 in a simplified manner, and a practical embodiment may include additional components and suitably configured processing logic to support known or conventional operating features that are not described in detail herein. A local interface 1012 interconnects the major components. The local interface 1012 can be, for example, but not limited to, one or more buses or other wired or wireless connections, as is known in the art. The local interface 1012 can have additional elements, which are omitted for simplicity, such as controllers, buffers (caches), drivers, repeaters, and receivers, among many others, to enable communications. Further, the local interface 1012 may include address, control, and/or data connections to enable appropriate communications among the aforementioned components.

The processor 1002 is a hardware device for executing software instructions. The processor 1002 may comprise one or more processors, including central processing units (CPU), auxiliary processor(s) or generally any device for executing software instructions. When the DAS device 1000 is in operation, the processor 1002 is configured to execute software stored within the memory 1010, to communicate data to and from the memory 1010, and to generally control operations of the DAS device 1000 pursuant to the software instructions. In an embodiment, the processor 1002 may include an optimized mobile processor such as optimized for power consumption and mobile applications. The I/O interfaces 1004 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like, via one or more LEDs or a set of LEDs, or via one or more buzzer or beepers, etc. The I/O interfaces 1004 can be used to display a graphical user interface (GUI) that enables a user to interact with the DAS device 1000 and/or output at least one of the values derived by the DAS analyzing module.

The radio 1006, if included, may enable wireless communication to an external access device or network. Any number of suitable wireless data communication protocols, techniques, or methodologies can be supported by the radio 1006, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); NarrowBand Internet of Things (NB-IoT); Long Term Evolution Machine Type Communication (LTE-M); magnetic induction; satellite data communication protocols; and any other protocols for wireless communication. The data store 1008 may be used to store data, such as DAS traces and DAS measurement data files. The data store 1008 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1008 may incorporate electronic, magnetic, optical, and/or other types of storage media.

The memory 1010 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 1010 may incorporate electronic, magnetic, optical, and/or other types of storage media. Note that the memory 1010 may have a distributed architecture, where various components are situated remotely from one another, but can be accessed by the processor 1002. The software in memory 1010 can include one or more computer programs, each of which includes an ordered listing of executable instructions for implementing logical functions. In the example of FIG. 9, the software in the memory 1010 includes a suitable operating system (O/S) 1014 and computer programs 1016. The operating system 1014 essentially controls the execution of other computer programs and provides scheduling, input-output control, file and data management, memory management, and communication control and related services. The program(s) 1016 may include various applications, add-ons, etc. configured to provide end-user functionality with the DAS device 1000. For example, example programs 1016 may include a web browser to connect with a server for transferring DAS measurement data files, a dedicated DAS application configured to control DAS acquisitions by the DAS acquisition device 1018, set DAS acquisition parameters, analyze DAS traces obtained by the DAS acquisition device 1018 and display a GUI related to the DAS device 1000. For example, the dedicated DAS application may embody a DAS analyzing module configured to analyze acquired DAS traces in order to perform acoustic and vibration measurements and produce DAS measurement data files.

It is noted that, in some embodiments, the I/O interfaces 1004 may be provided via a physically distinct mobile device (not shown), such as a handheld computer, a smartphone, a tablet computer, a laptop computer, a wearable computer or the like, e.g., communicatively coupled to the DAS device 1000 via the radio 106. In such cases, at least some of the programs 1016 may be located in a memory of such a mobile device, for execution by a processor of the physically distinct device. The mobile may then also include a radio and be used to transfer DAS measurement data files toward a remote test application residing, e.g., on a server.

It should be noted that the DAS device shown in FIG. 9 is meant as an illustrative example only. Numerous types of computer systems are available and can be used to implement the DAS device.

The embodiments described above are intended to be exemplary only and one skilled in the art will recognize that numerous modifications can be made to these embodiments without departing from the scope of the invention.

Although the present disclosure has been illustrated and described herein with reference to specific embodiments and examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

The invention claimed is:

1. A fiber optic distributed acoustic sensing (DAS) method for performing acoustic and vibration measurements, the method comprising:

performing repetitive DAS acquisitions toward an end of an optical fiber link using a DAS acquisition device comprising a coherent Optical Time Domain Reflectometer (OTDR) to provide DAS traces, wherein each DAS acquisition is performed by propagating in the optical fiber link, a pulsed test signal and detecting corresponding return light from the optical fiber link so as to obtain a DAS trace representing backscattered and reflected light as a function of distance in the optical fiber link;

processing DAS traces in groups to produce a DAS signal associated with each said group; and changing at least one of an optical frequency and an optical phase of said pulsed test signal while performing said repetitive DAS acquisitions such that said at least one of an optical frequency and an optical phase varies in-between groups of DAS traces while remaining substantially constant within each said group.

2. The DAS method as claimed in claim 1, wherein said at least one of an optical frequency and an optical phase is continuously dithered while performing said repetitive DAS acquisitions.

3. The DAS method as claimed in claim 1, wherein said at least one of an optical frequency and an optical phase is tuned in steps in-between said groups.

4. The DAS method as claimed in claim 1, wherein optical frequencies or phases associated with said groups are evenly distributed.

5. The DAS method as claimed in claim 1, further comprising averaging the DAS signals associated with a plurality of groups to provide a frequency or phase averaged DAS signal in which the polarization fading effect is substantially suppressed.

6. The DAS method as claimed in claim 1, further comprising averaging the DAS signals associated with a plurality of groups to provide a frequency or phase averaged DAS signal and repeating said steps of performing repetitive DAS acquisitions, processing DAS traces, changing said at least one of an optical frequency and an optical phase and averaging the DAS signals to provide a plurality of frequency or phase averaged DAS signals.

7. The DAS method as claimed in claim 6, wherein said DAS acquisitions are performed in groups of K DAS traces and said groups of DAS traces are processed to obtain a plurality of independent groups of DAS traces and a corresponding plurality of DAS signals, such that independent DAS signals are obtained using said independent groups of DAS traces.

8. The DAS method as claimed in claim 1, wherein a time lapse ΔT is left in-between groups of DAS acquisitions to prevent memory saturation and allow time for processing said group of DAS traces before DAS acquisitions of the next group.

9. The DAS method as claimed in claim 8, wherein no test signal is propagated in said optical fiber link during said time lapse ΔT.

10. The DAS method as claimed in claim 8, wherein DAS acquisitions performed during said time lapse ΔT are discarded.

11. A fiber optic distributed acoustic sensing (DAS) system for performing acoustic and vibration measurements, the DAS system comprising:

a DAS acquisition device connectable toward an end of the optical fiber link and comprising a coherent Optical Time Domain Reflectometer (OTDR) for performing repetitive DAS acquisitions, wherein each DAS acquisition is performed by propagating in the optical fiber link, a pulsed test signal and detecting corresponding return light from the optical fiber link so as to obtain a DAS trace representing backscattered and reflected light as a function of distance in the optical fiber link, wherein said coherent OTDR is tunable;

a memory to store said DAS traces, at least one group of DAS traces at a time; and a processing unit receiving and processing DAS traces in groups to produce a DAS signal associated with each said group; and the DAS acquisition device comprising a control box used to tune said coherent OTDR while performing said repetitive DAS acquisitions such that at least one of an optical frequency and an optical phase of said pulsed test signal varies in-between groups of DAS traces while remaining substantially constant within each said group.

12. The DAS system as claimed in claim 11, wherein said at least one of an optical frequency and an optical phase is dithered while performing said repetitive DAS acquisitions.

13. The DAS system as claimed in claim 11, wherein said at least one of an optical frequency and an optical phase is tuned in steps in-between said groups.

14. The DAS system as claimed in claim 11, wherein said coherent OTDR comprises a coherent laser source and a laser current driver and wherein said optical frequency is tuned by the driver slowly modulating the laser current of the coherent laser source.

15. The DAS system as claimed in claim 11, wherein said coherent OTDR comprises a coherent laser source and a temperature controller and wherein said optical frequency is tuned by the temperature controller slowly modulating a temperature of the coherent laser source.

16. The DAS system as claimed in claim 11, wherein optical phases associated with said groups are evenly distributed.

17. The DAS system as claimed in claim 11, said control box is configured to leave time lapse ΔT in-between groups of DAS acquisitions to prevent memory saturation and allow time for processing said group of DAS traces before DAS acquisitions of the next group.

18. The DAS system as claimed in claim 17, wherein said controller box is configured to drive said DAS acquisition device to stop propagating test signal in said optical fiber link during said time lapse ΔT.

19. The DAS system as claimed in claim 17, wherein said controller is configured to drive said DAS acquisition device to perform DAS acquisitions during said time lapse ΔT but discard them.

\* \* \* \* \*